June 23, 1936.  G. W. LAWRENCE  2,045,543
CONTROL DRIVE FOR PARCEL POST MACHINES
Filed Oct. 23, 1931    25 Sheets-Sheet 1

INVENTOR
George W. Lawrence,
BY Clarence B. Foster
ATTORNEY

June 23, 1936. G. W. LAWRENCE 2,045,543
CONTROL DRIVE FOR PARCEL POST MACHINES
Filed Oct. 23, 1931 25 Sheets-Sheet 8

INVENTOR
George W. Lawrence,
BY
Clarence B. Foster
ATTORNEY

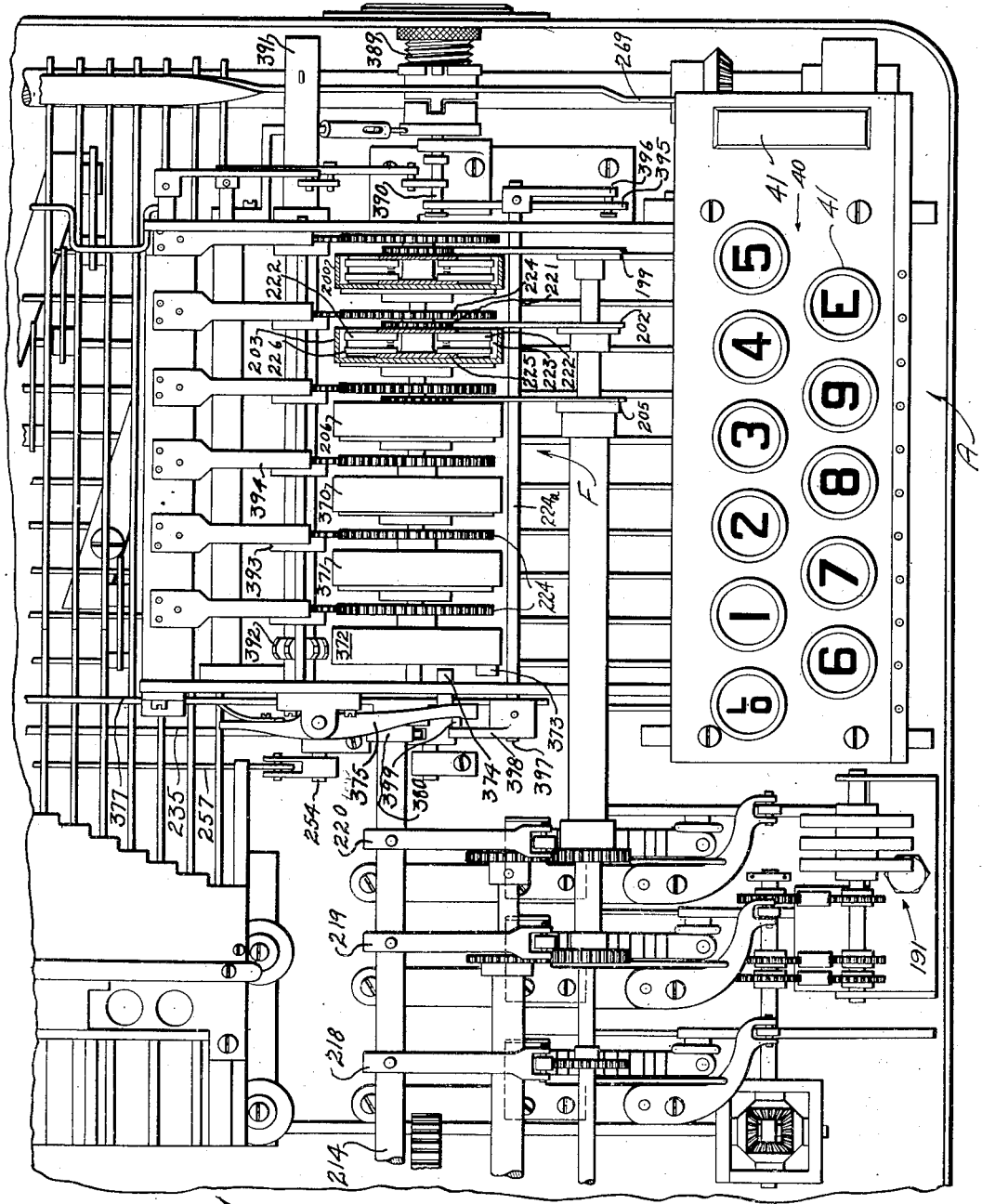

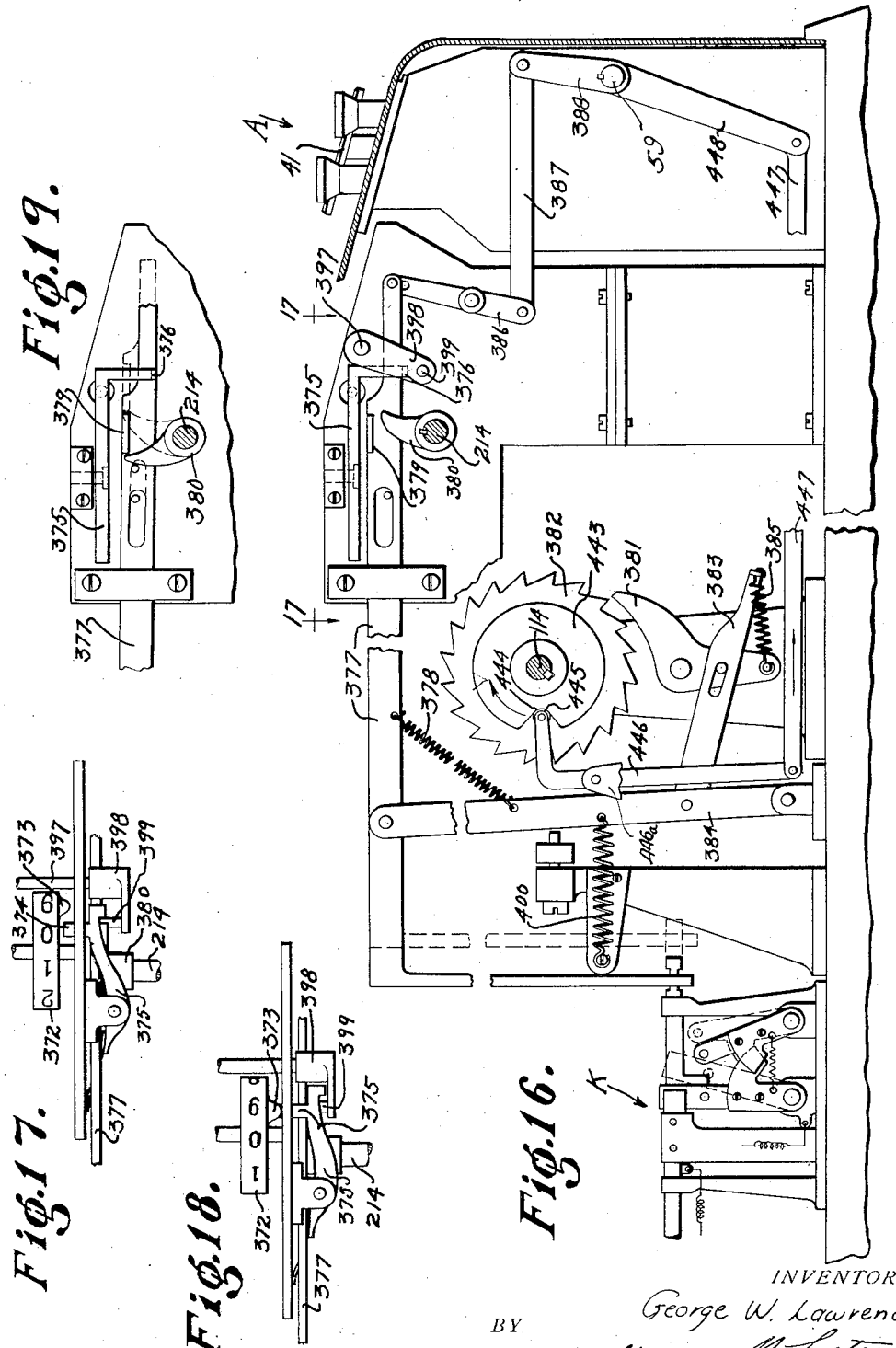

June 23, 1936.　　G. W. LAWRENCE　　2,045,543
CONTROL DRIVE FOR PARCEL POST MACHINES
Filed Oct. 23, 1931　　25 Sheets-Sheet 17
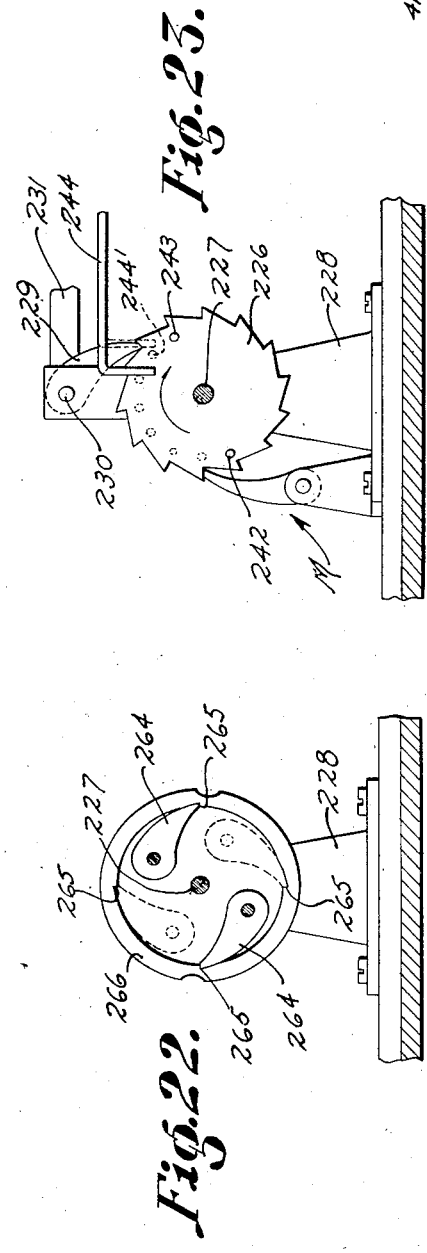
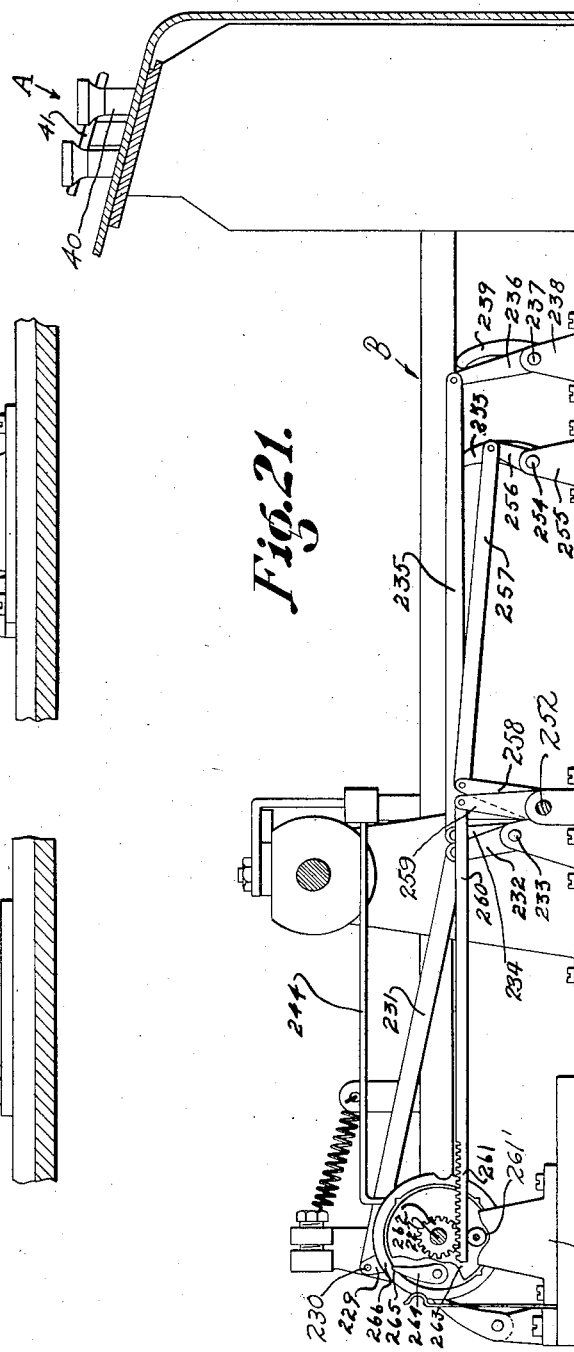
INVENTOR
BY George W. Lawrence,
Clarence B. Foster
ATTORNEY June 23, 1936. G. W. LAWRENCE 2,045,543
CONTROL DRIVE FOR PARCEL POST MACHINES
Filed Oct. 23, 1931 25 Sheets-Sheet 18
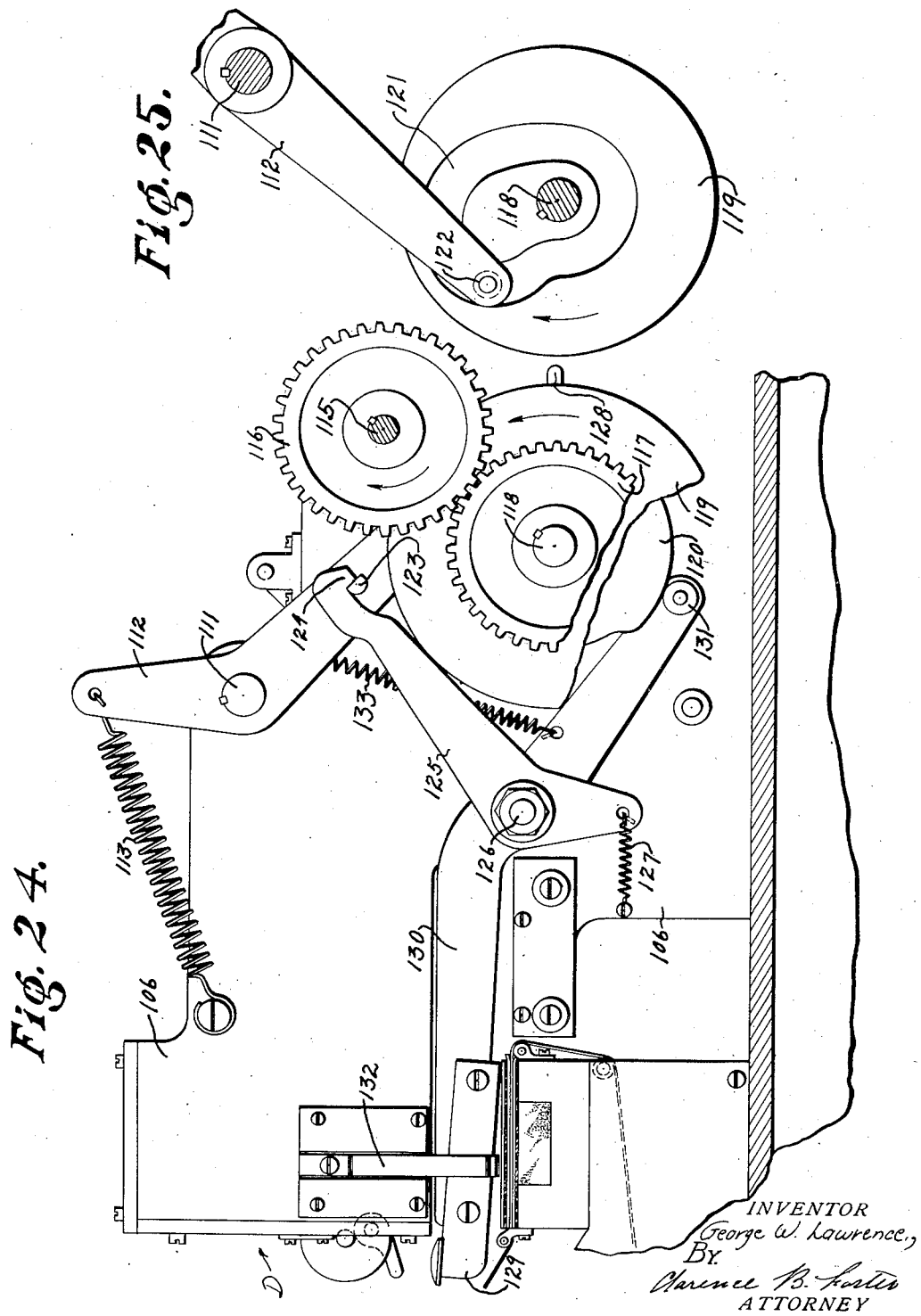
INVENTOR
George W. Lawrence,
BY
Clarence B. Foster
ATTORNEY

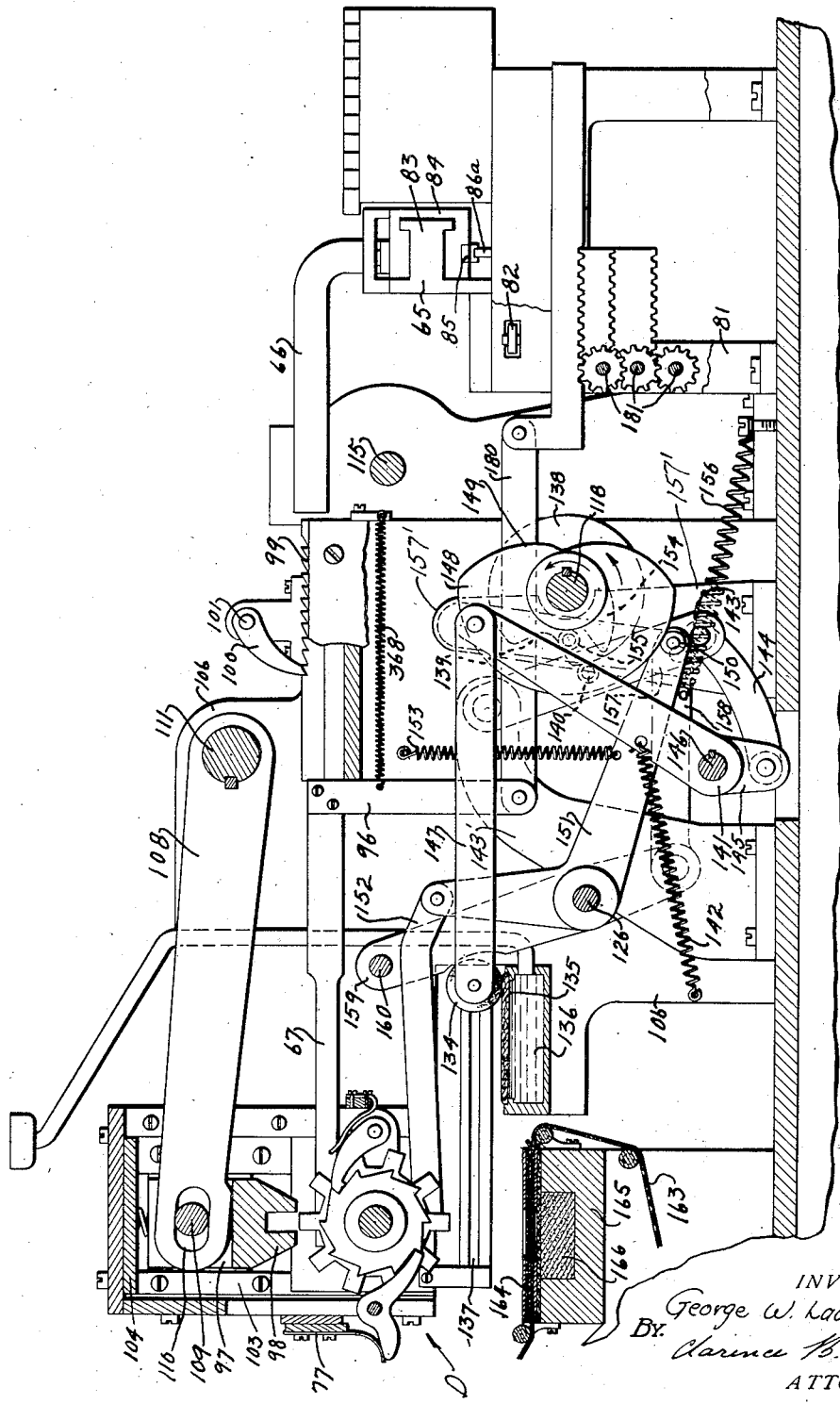

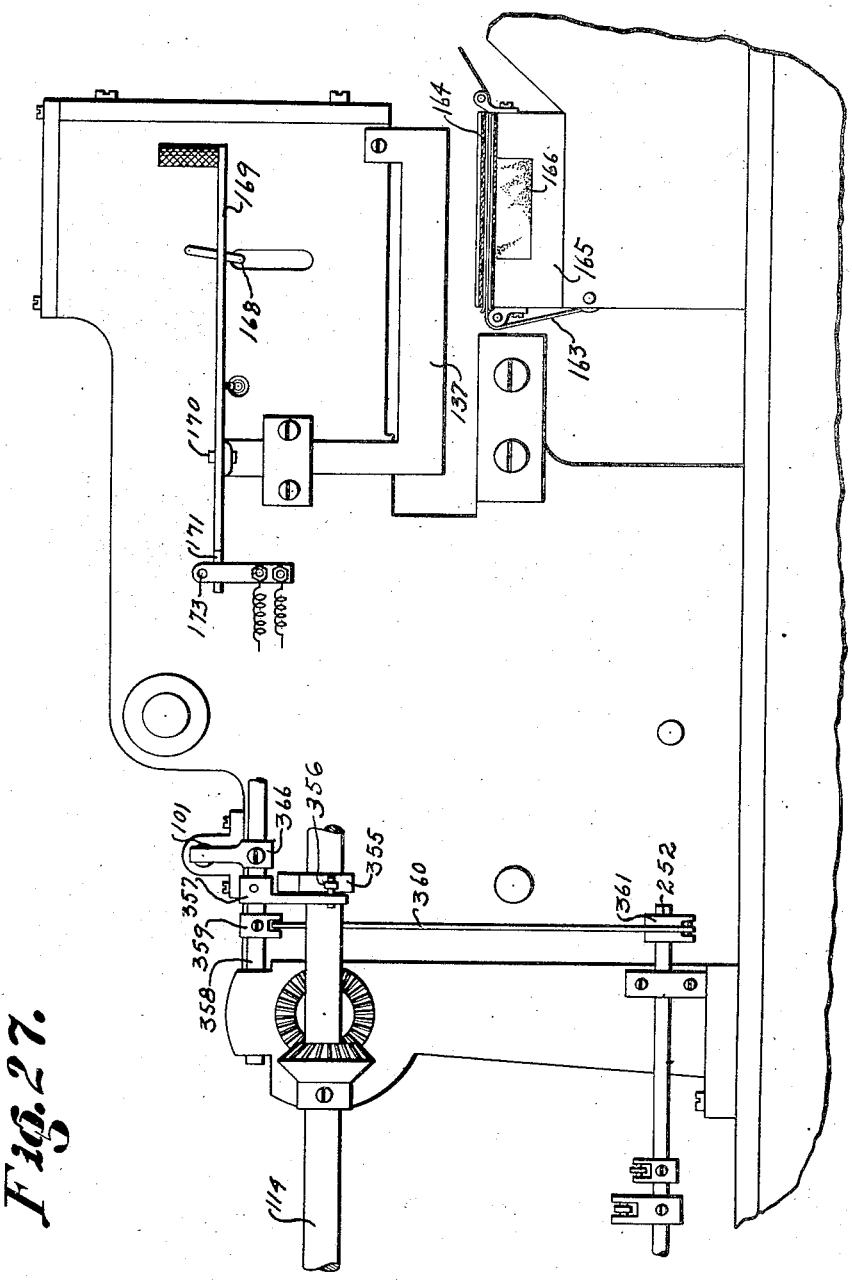

June 23, 1936.　　　　G. W. LAWRENCE　　　　2,045,543
CONTROL DRIVE FOR PARCEL POST MACHINES
Filed Oct. 23, 1931　　　25 Sheets-Sheet 23

INVENTOR
George W. Lawrence,
BY
Clarence B. Foster
ATTORNEY

June 23, 1936.  G. W. LAWRENCE  2,045,543
CONTROL DRIVE FOR PARCEL POST MACHINES
Filed Oct. 23, 1931   25 Sheets-Sheet 24
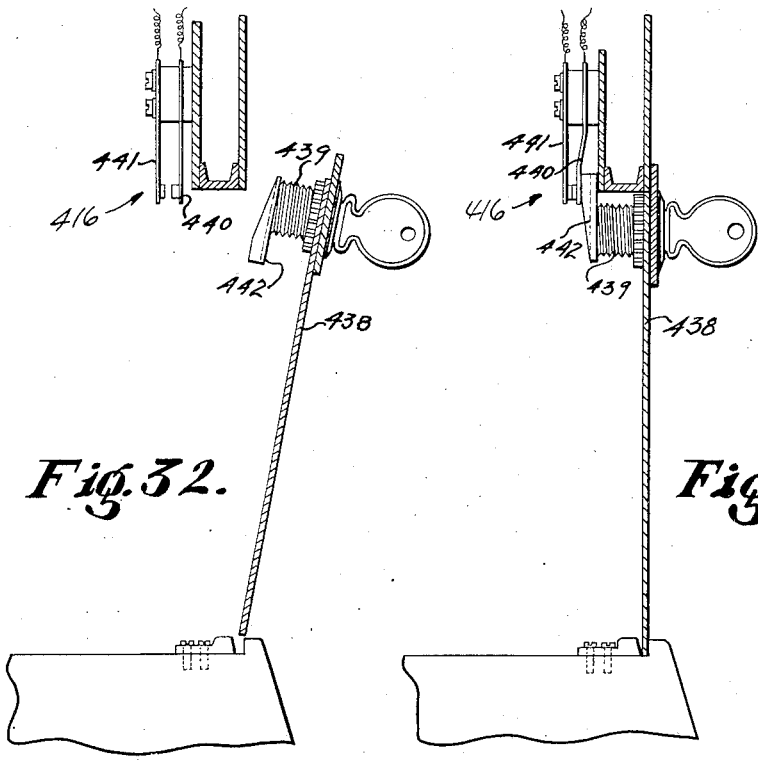
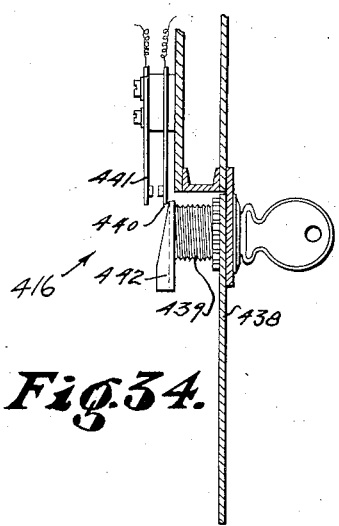
INVENTOR
George W. Lawrence,
BY
Clarence B. Foster
ATTORNEY

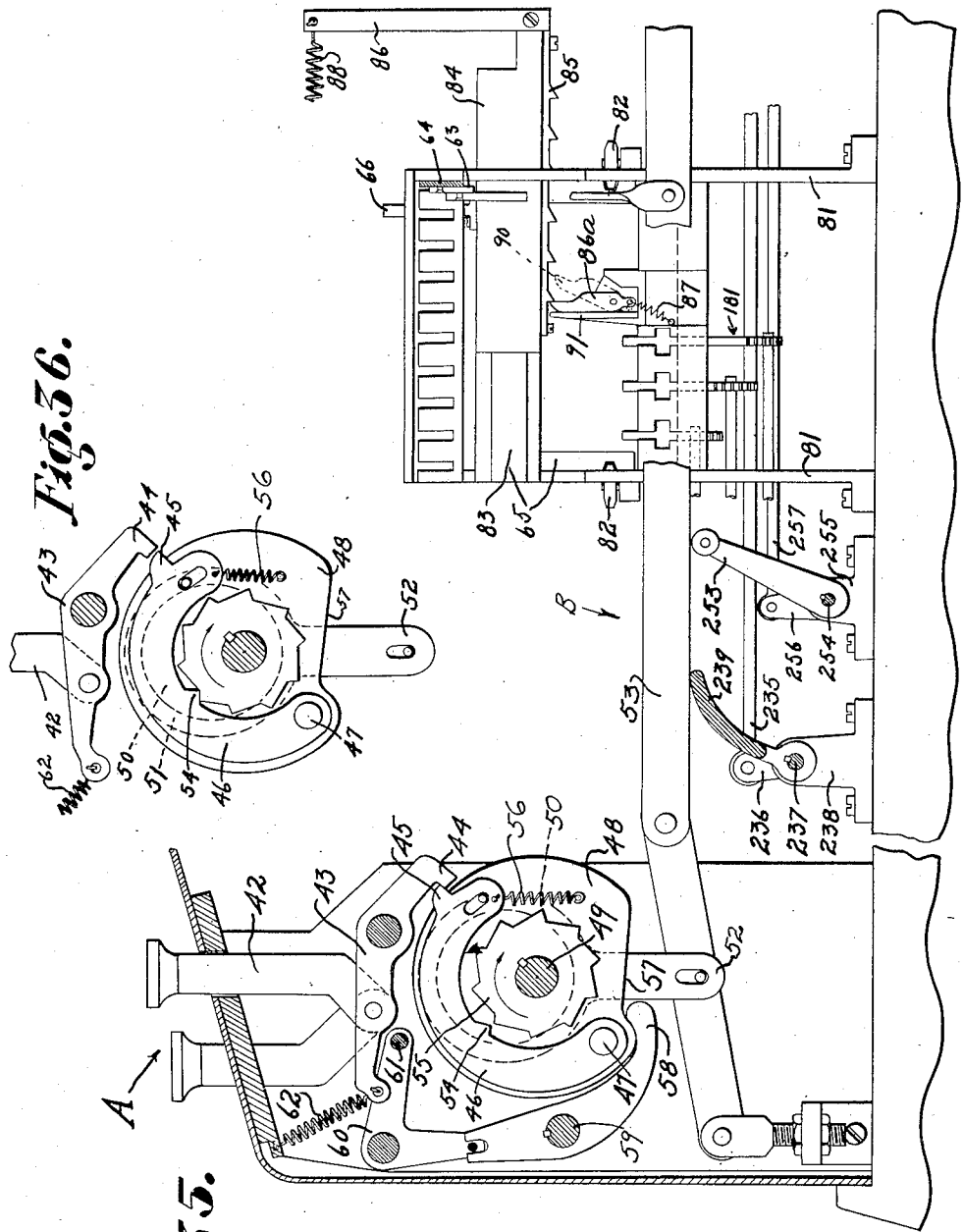

Patented June 23, 1936

2,045,543

UNITED STATES PATENT OFFICE 2,045,543

CONTROL DRIVE FOR PARCEL POST MACHINES

George W. Lawrence, Los Angeles, Calif., assignor, by mesne assignments, to Postal Automatic Machines, Inc., a corporation of Delaware Application October 23, 1931, Serial No. 570,634

1 Claim. (Cl. 235—101)

This invention relates to a control drive for parcel post machines adapted to be used in conjunction with machines such as the parcel post machine disclosed in a co-pending application, Serial No. 367,106, filed May 29, 1929, by William J. Pearson, entitled Parcel post weighing and stamp printing machine.

The parcel post weighing and printing machine disclosed in that application is designed for printing purposes, and to register the printing operations thereof, more particularly the printing and registering of metered parcel post stamps bearing the name of the place of original mailing, the date, the zone number to which the package is addressed, the weight of the package, the monetary value of the stamp calculated from the weight and the zone, the serial number, and such other words, phrases, figures, designations and decorations as may be desired. This mechanism is used in conjunction with a scale and a paper supply and a moistener, and may be driven and used for any printing purpose.

This mechanism is particularly adapted for the printing of parcel post stamps upon a paper strip fed through the machine, printed, cut to the proper stamp length, and moistened on its gummed side at the delivery point of the machine.

The requirements of the Post Office Department for a machine of this character include the requirement for sufficient locking devices to render it practically impossible to obtain an imprint of a stamp without registering the monetary value of the stamp so printed within the meters provided for that purpose.

Another requirement of the Post Office Department is for a meter which may be set for a predetermined amount of postage by an authorized agent of the Post Office Department at the time of the purchase of the postage, which will subtract the amount of postage consumed by the printing of each stamp, and which, upon the exhaustion of the postage pre-set in such a meter, will operate to lock the entire machine against further operations of printing stamps until the meter has again been set for an amount of postage by an authorized person, which presetting operation will unlock the meter controlled locking mechanism and allow the machine to be operated for further printing operations.

A further requirement of the Post Office Department is that a duplicate stamp be printed by the machine when the original stamp is printed, and that this duplicate tape be carried to the post office with the stamped packages for the purpose of checking the stamped packages against the duplicate tape by the Post Office Department; to this end I have provided a duplicate printing mechanism wherein a duplicate stamp is printed through the original stamp when the original is printed.

An object of my invention is to provide means whereby the various movements of the different elements comprising a parcel post machine may be controlled and safeguarded against fraudulent use and against incorrect operation such as the issuance of an incorrect or a mutilated stamp and the registry of the monetary value of this mutilated stamp in the meters, with consequent confusion and possible loss to the user of the machine.

An object of this invention is to provide a machine wherein the interests of the Post Office Department regarding the issuing of stamps mechanically by a printing operation through a machine are absolutely safeguarded, and wherein it is practically impossible to obtain a fraudulent print of a stamp; the main safeguard for the Post Office Department is that a stamp cannot be obtained from this machine without registering the amount of the stamp in a pair of meters; the main safeguard to the user of the machine is that it is practically impossible to obtain a fraudulent stamp from this machine printing of or to print a mutilated stamp for which the user of the machine might stand liable for monetary loss.

A further object of my invention is to provide a controlling means, including a signal device, for notifying the operator of the machine that the supply of either of the paper tapes to the printers has ceased, thus securing the user against the possibility of printing a stamp without having the proper paper tape supplied to the printer for that purpose.

An object of my invention is to provide a control means, wherein the operations of the keyboard actuate a controlling mechanism to render it impossible to operate the machine for printing purposes until the proper number of key-actuations have been effected in the keyboard; as an example, the particular form of parcel post machine disclosed operates with six numeral wheels for the printing of a stamp; therefore, there must be six key-manipulations on the keyboard to properly set up the machine for printing purposes; should a different number of key-manipulations be performed instead of the required six, the control element functions to maintain the machine in a non-printing relation except upon the sixth key-manipulation in the setting-up operation; if the operator, instead of performing a printing operation within the machine, manipulates the seventh key, locking device again locks the machine so that it cannot be operated for printing purposes. To provide for errors of this character, I have included a clearing mechanism, operated by means of the error key on the keyboard, whereby the entire machine may be cleared of the set-up at the will of the operator, whereupon it will be in condition to proceed with the next set-up operation.

An object of my invention is to provide a keyboard wherein the keys will be locked against operation after one key has been depressed and until the completion of the transmitting of the movement from that key into the machine, whereupon the entire keyboard is again released; wherein the entire keyboard will be locked during a printing operation of the machine; wherein the keyboard may be locked by the operator when leaving the machine and locking it against use during his absence; and wherein the keyboard may be locked at the time that the locking operation of the machine is instituted upon the exhaustion of the pre-set amount of postage set in the control meter.

An object of my invention is to provide an electrical system for the operation of a parcel post machine wherein it is required that different elements comprising the operative mechanism of the machine must be in proper functioning relation before the parcel post machine can be operated for printing purposes; to this end I have provided a series of electrical switches incorporated into the motor circuit, thus providing means for disconnecting the electrical current from the motor upon the disarrangement of any of the several elements which have electrical switches connected to them. I have provided a main switch for disconnecting the electrical current entirely from the machine at the will of the operator, this switch being operated by a key lock from which the key may be removed when locked, thus preventing tampering with the machine; this same key lock also operates the lock in the keyboard.

In the motor circuit I have provided a meter controlled lock switch which operates upon the exhaustion of the control meter; a dater switch which operates upon removal of the dater from the numeral printer; a solenoid operated switch which is controlled by the presence or absence of the paper tapes between electrical contacts associated therewith; and a switch for opening the motor circuit when the door giving access to the paper rolls and inking mechanism is open, thus preventing operation of the machine during the threading-up process; normally all of these switches are closed, the motor circuit is completed, and the machine may be operated for printing purposes.

An object of my invention is to provide means for controlling the directional movement of the mechanism of the machine; for that purpose I have provided a non-reverse element which prevents the rotation of the main driving shaft in a reverse direction and which, together with the meter-controlled lock operated upon the exhaustion of the control meter, locks the main drive shaft so that it cannot be operated in either direction.

An object of my invention is to provide a means for connecting the source of power with the main drive shaft, comprising a power clutch so designed that in conjunction with the progressive release lock it cannot be operated until the progressive release lock has been actuated by the proper number of key-manipulations in the keyboard; which clutch may be manually operated by the operator to connect the source of power with the drive shaft; and which will, upon one rotation of the drive shaft, automatically become disconnected at a predetermined point in the revolution of the drive shaft.

This power clutch is so designed, in combination with the progressive release lock, that, although the control key may be held down, the clutch will only operate once, and cannot be operated again until the proper number of keys have been manipulated on the keyboard, thus preventing a repetition of the printing of a stamp, and the consequent incorrect registering of additional stamps in the meters.

An object of my invention is to provide a meter-controlled locking mechanism, which will function to lock the entire machine against operation upon the exhaustion of an amount of postage previously set in the control meter, and which will perform this locking operation at the completion of a printing operation; this permits the stamp just printed in the last operation of the machine to be discharged and used, and leaves the machine, aside from the locking mechanism, in a normal condition ready, upon the resetting of the control meter and the consequent unlocking of the locking mechanism, to be operated for the purpose of printing stamps, without any additional adjustments or changes in the mechanism. This meter-controlled locking mechanism is not directly actuated by the meter, but is released by the meter that it may be power operated, at the completion of a printing operation by elements gear-related to the drive shaft.

An object of my invention is to provide a clearing mechanism which is automatically operated by mechanism attached to the main drive shaft at the completion of a printing operation, and which may be operated by means of a control key upon the keyboard at any time that the operator may desire, as in the case of an error in the setting-up operation the operator may desire to clear the incorrect set-up and begin a new operation. This clearing operation, whether mechanical or manual, includes resetting the progressive release lock and adjusting the controls attached thereto which govern the operation of the power clutch so that it will be necessary to manipulate the proper number of keys in the keyboard before the clutch can be operated to institute a printing operation.

This clearing device also returns the selector to its original position, picking it up at whatever position it may be in at the time the clearing action is instituted. The clearing mechanism also allows the numeral wheels of the printer to return to their original position regardless of how far the setting-up operation has progressed; the meter set-up mechanism, being attached to the set-up elements of the numeral printer, is also returned to original position, as is the connected indicating device, which provides the operator with a visible reading of the monetary values set up in the machine.

Unless the clearing operation is complete the machine is not operable, thus preventing the possibility of printing a mutilated stamp. While these mutilated stamps may be redeemed at the post office, the mutilating of a stamp and the consequent registering in the meters of an incorrect amount causes considerable trouble and confusion both for the user of the machine and the Post Office Department in making a correction of the meter readings and in the subsequent adjustment between the user and the Post Office Department in the purchasing of stamps.

Various other objects and advantages will be more fully apparent from the following description of the accompanying drawings which form a part of this disclosure, and which illustrate a preferred form of embodiment of the invention.

Of the drawings:

Fig. 15 is an enlarged plan view of the right hand front section of the parcel post machine disclosed in Fig. 2 and showing in detail the control meter and the meter locking and re-setting mechanism, with certain parts sectioned to disclose parts otherwise hidden.

Fig. 16 is an enlarged detail view in elevation of the meter-controlled locking mechanism, other parts being omitted;

Fig. 17 is a fragmental plan view of the tripping mechanism in disengaged position, taken approximately on line 17—17 of Fig. 16;

Fig. 18 is a fragmental view, similar to Fig. 17, showing the trip in engaged position;

Fig. 19 is a fragmental view of the tripping mechanism shown in Fig. 16, in two positions as engaged by the power means.

Fig. 21 is a fragmental view in elevation, from the left, of the progressive release lock and its connections shown in Fig. 20;

Fig. 22 is a fragmental sectional view of the ratchets of the progressive release lock, taken on line 22—22 of Fig. 20;

Fig. 23 is a fragmental view of the ratchet wheel of the progressive release lock, taken on line 23—23 of Fig. 20;

Fig. 24 is a front elevational view of the numeral printer, taken approximately on line 24—24 in Fig. 3, with parts broken away to disclose parts otherwise hidden.

Fig. 25 is a view of the cam which actuates the numeral printer, taken opposite to the view shown in Fig. 24;

Fig. 26 is a sectional view from the front of the numeral printer similar to the left hand portion of Fig. 8, with the front plate removed, disclosing the mechanism therein and the serial numbering printer, with certain parts sectioned.

Fig. 27 is a detail sectional view taken on line 27—27 of Fig. 3, and showing the numeral printer, the dater switch and part of the clearing mechanism.

Fig. 32 is a semi-diagrammatic view from the rear of the door lock and switch with the door partly open;

Fig. 33 is a view similar to Fig. 32, showing the door closed, the lock turned and the electrical contacts closed;

Fig. 34 is a fragmental view similar to Fig. 33, showing the door in closed position with the lock unlocked and the switch open;

Fig. 35 is a view in section of the keyboard mechanism, taken from the right and showing the clutch contained therein; this view also showing the selector and its connections to the clutch;

Fig. 36 is a detail of the clutch mechanism disclosed in Fig. 35, showing it in contacted position.

Figure 1:
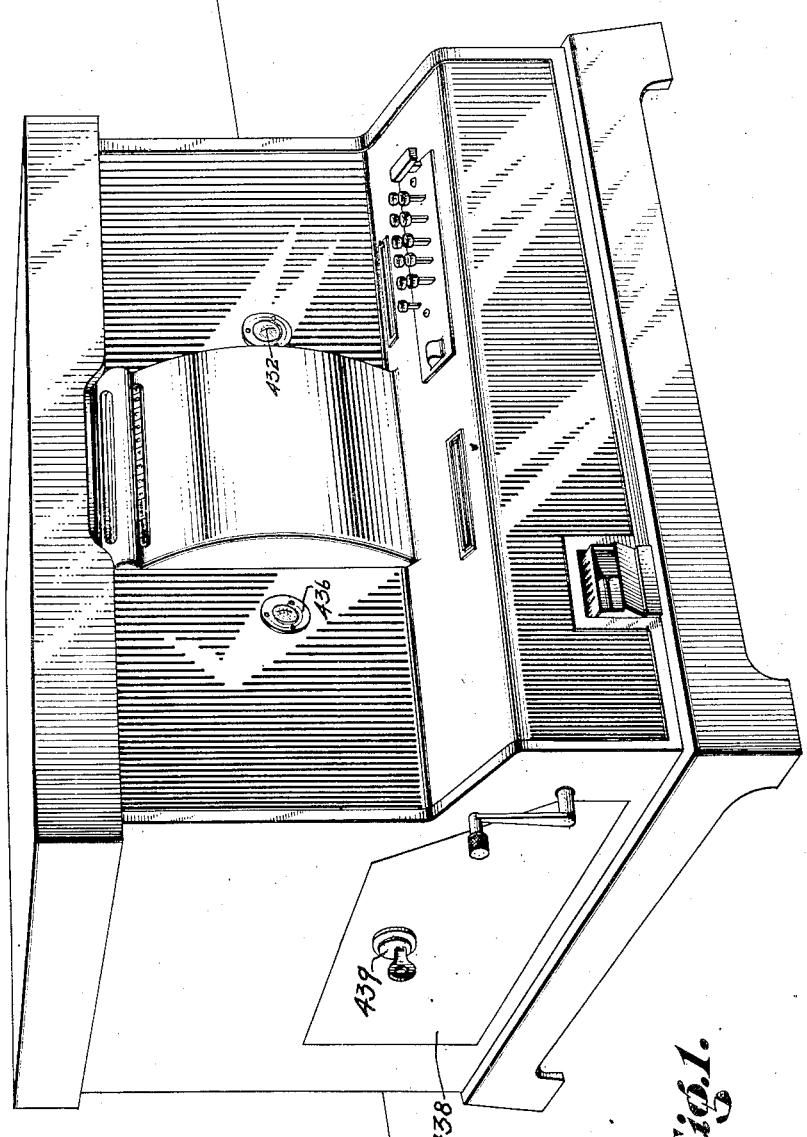
Fig. 1 is a perspective view of a parcel post machine constructed in accordance with the present invention.
Figure 2:
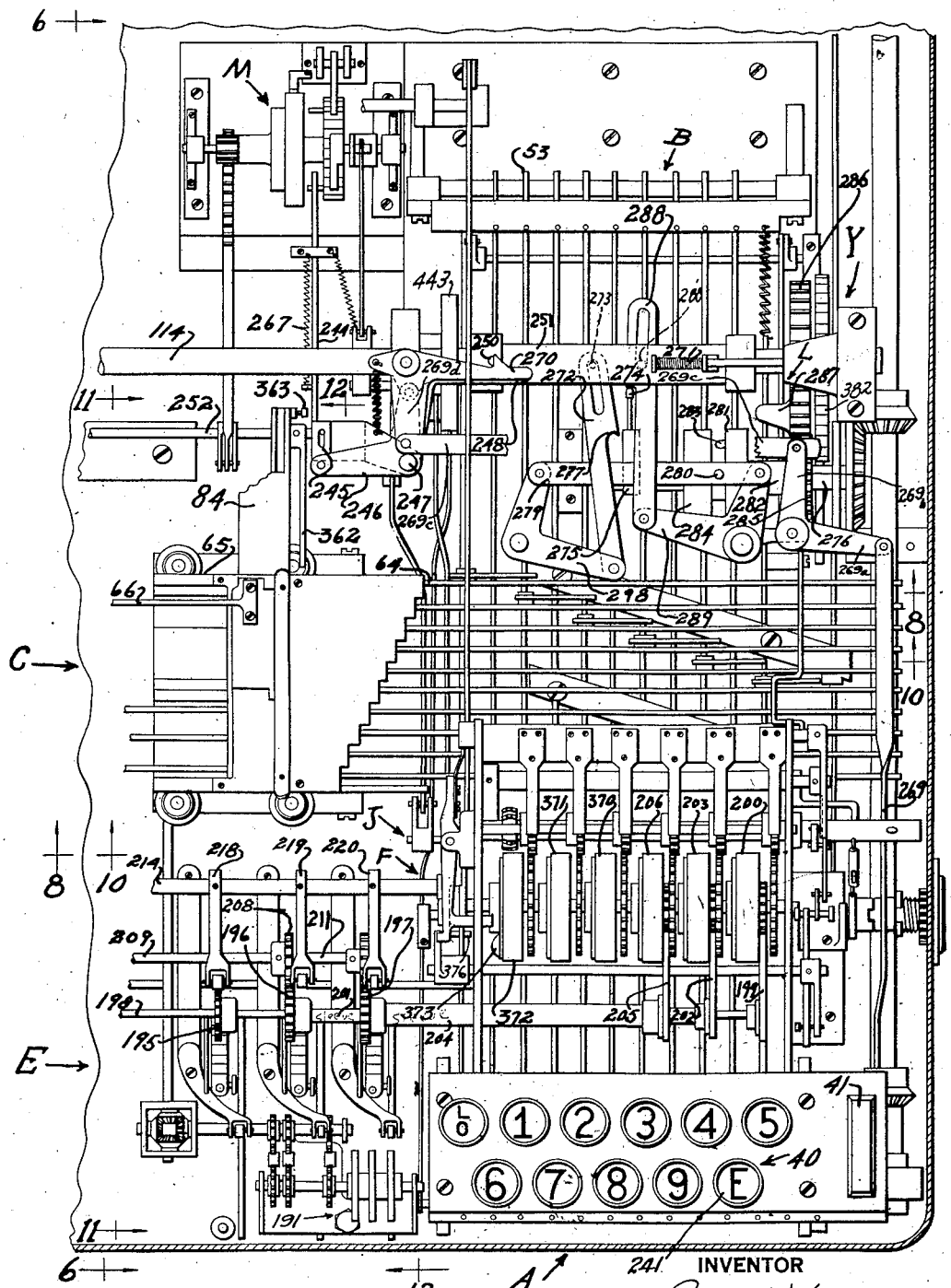
Fig. 2 is a plan view of the right hand front portion of the machine with the casing broken away to disclose the interior mechanism.
Figure 3:
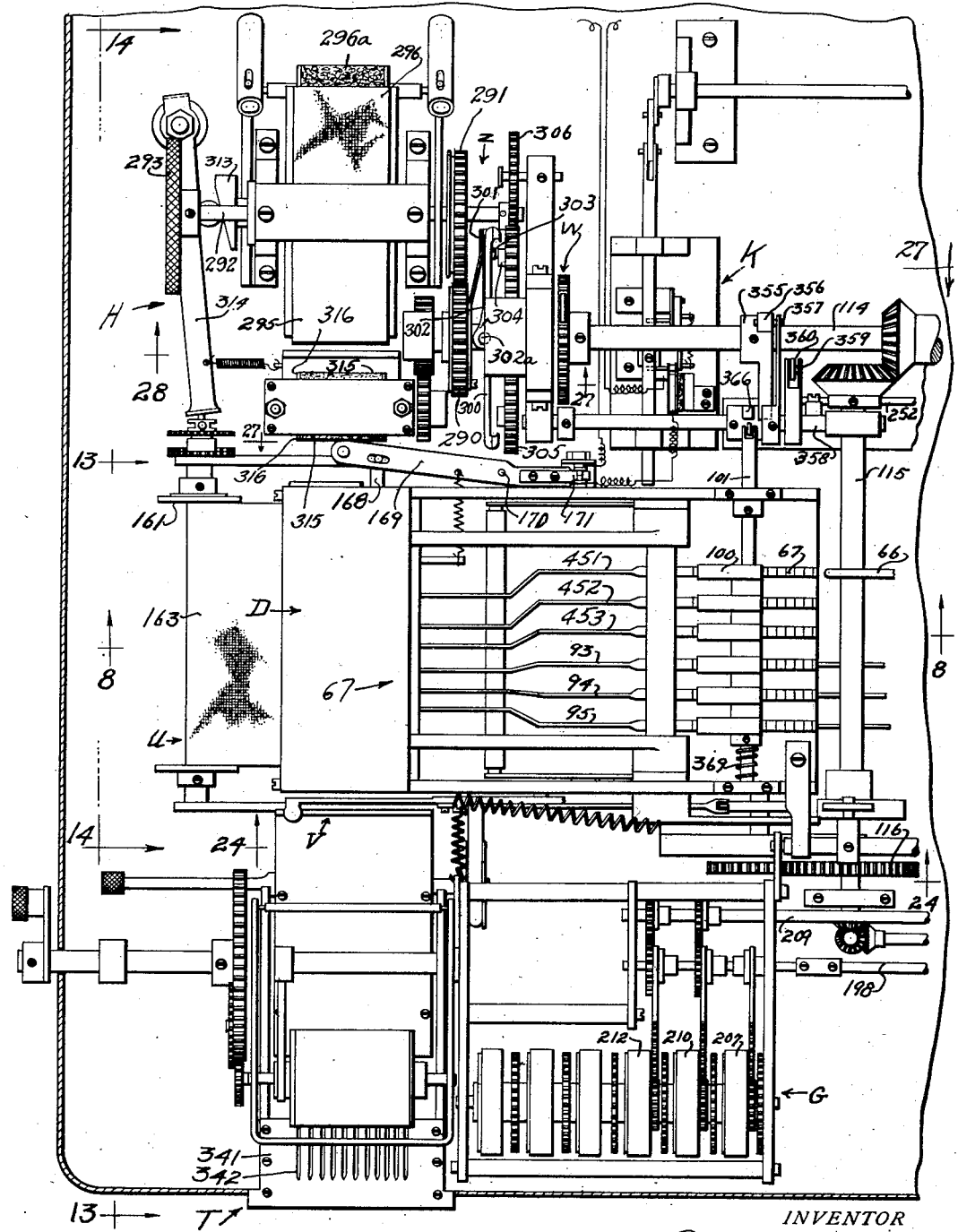
Fig. 3 is a similar plan view of the machine, disclosing the left hand front section adjoining Fig. 2.

In Figs. 2 and 3 is disclosed the keyboard A; connected to it are the key bars B and the selector C, which operate the numeral printer D (Fig. 3); the meter set-up mechanism E (Fig. 2) operates the control meter F and also the permanent total meter G (Fig. 3). The rotary printer H (Fig. 3) operates on the paper tape before it reaches the numeral printer D.

On Fig. 2 is shown the meter controlled lock J, the switch K which this locking mechanism controls is shown on Fig. 3. For connecting the source of power with the driven elements I have provided a power clutch L (Fig. 2), which is controlled by the progressive release lock M, (Fig. 2).

Figure 4:
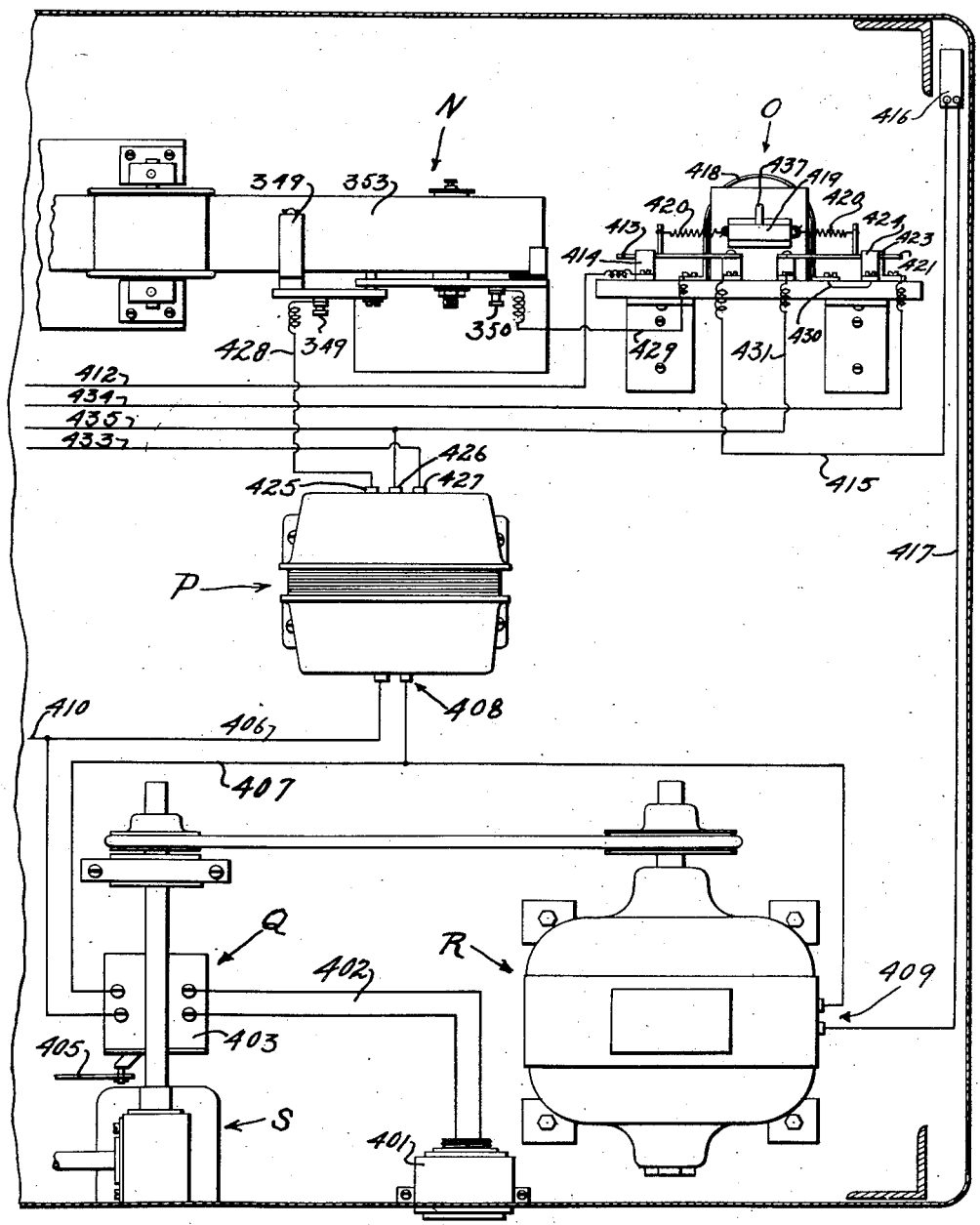
Fig. 4 is a similar plan view of the rear section of the machine adjoining Figs. 2 and 3.

A paper roll carrier N (Fig. 4) is provided; upon it the rolls of paper are placed to be fed through the machine; operating co-ordinately with this device is an electrical switching device controlled by the presence or absence of the paper tapes on the paper roll carrier N. This switching device will hereafter be termed the solenoid switch unit O; a transformer P supplies low voltage current for the use of this device and to illuminate the scale dial and signal lamps.

To enable the operator to disconnect the electrical circuits from the source of electrical energy in the machine, I have provided the main switch Q; the electrical circuits from the main switch Q supply the transformer P and an electrical motor R which supplies motive power for the operation of the machine by means of the speed reducing and gear connecting elements S.

I have provided a moistener T (Fig. 3) to moisten and discharge the completed stamp. For the printing of a duplicate stamp I have provided a duplicating device with a ribbon feed U associated with the numeral printer D, (Fig. 3); also for the severing of the completed stamp from the paper tape I have provided a knife V. To provide for rotation of the main drive shaft in one direction only I have provided the non-reverse element W, (Fig. 3), and for locking the machine upon the exhaustion of a pre-set amount of postage in the control meter, I have provided an additional locking element operated by the locking mechanism J in the ratchet device Y, (Fig. 2).

Figure 28:
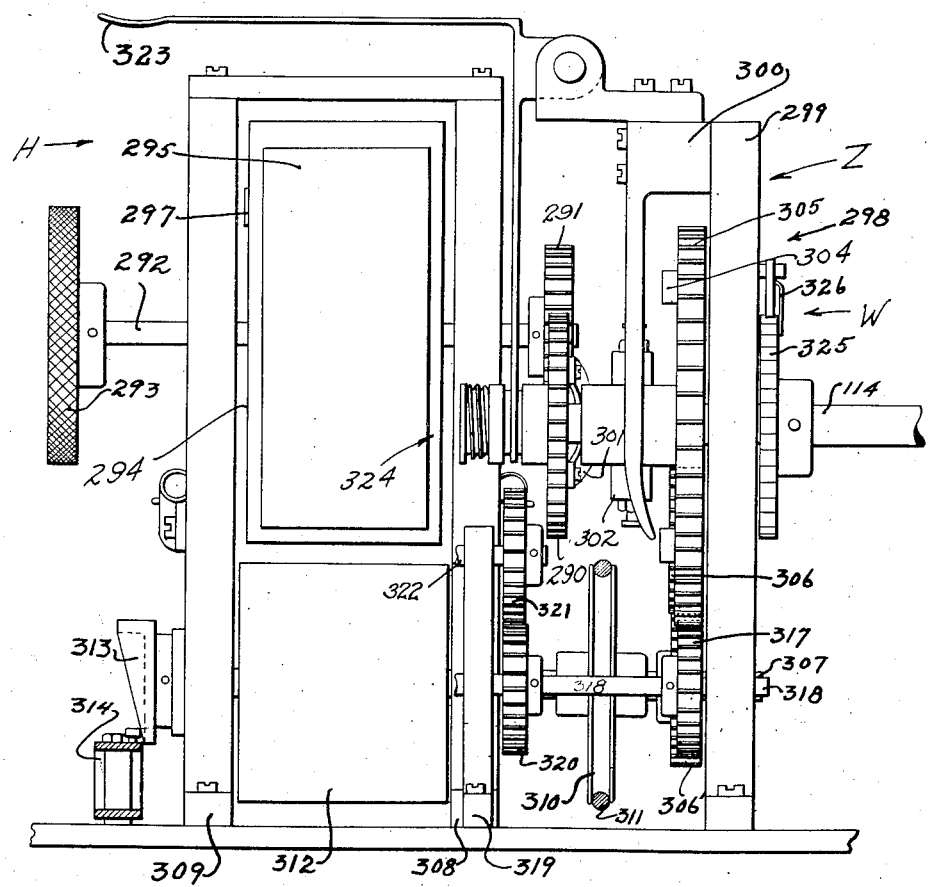
Fig. 28 is a vertical sectional view of the rotary printer, taken approximately on line 28—28 in Fig. 3, and showing the intermittent clutch.

For the timed control and operation of the conveying elements which forward the paper tape through the machine in conjunction with the printing operations of the rotary printer H, I have provided the intermittent clutch Z operated directly from the main drive shaft of the machine (Figs. 3 and 28).

To clearly describe the functions of the control drive in the parcel post machine, I will first describe in some detail the operative elements contained in the machine, their connection with the drive, and the associated controls, which govern the operations of the various operative elements of the machine.

The source of movement, in the first operation in the printing of a stamp, which is the setting-up of the numerals required to properly print the stamp, is the keyboard A. The keyboard A is provided with a single bank of ten keys numbered consecutively from 0 to 9 inclusive, an error key 40 for clearing the machine, and a control key 41 for operating the power clutch L.

The keys are a form of clutch connecting means; each key is mounted on a key bar 42 (Fig. 35) which connects to a rocking arm 43, provided with a latch portion 44 normally engaging the engaging member 45 of the latch 46 fulcrumed at 47 on the cam 48; this cam 48 is rotatably mounted on the drive shaft 49, and has secured to one side of it an eccentric 50, upon which operates an eccentric ring 51 having an extension 52 which conveys the reciprocating movement created therein to the connected key bar 53.

The latch 46 remains in open-clutch position while the trip 44 maintains the tooth 54 in a position out of engagement with the continuously rotating toothed wheel 55, which is secured to the drive shaft 49 and is the drive element of the clutch. Upon the depression of a key on the keyboard the trip 44 is disengaged from the engaging member 45 of the latch 46, allowing the latch 46, under tension of the spring 56, to move the tooth 54 into the path of one of the teeth of the toothed wheel 55; upon the engagement of the teeth the cam 48 is rotated and the eccentric ring 51 is actuated to convey a reciprocating movement to the extension 52 and the key bar 53.

For the purpose of disengaging the clutch at the completion of one revolution, I have provided a cam face 57 on the cam 48 on which rides the cam slide 58, secured to rock shaft 59; upon the rotation of the cam 48, the slide 58 is rocked according to the variation of the cam face and this rocking movement rocks the bell crank lever 60, which it contacts; the rocking of the bell crank lever 60 raises the shaft 61 into contact with the rocking lever 43, thereby raising the depressed key to its normal position and at the same time moving the trip 44 into the path of the engaging member 45; upon the complete revolution of the clutch, the engaging member 45 is back to its starting position in engagement with the trip 44, where it is retained by means of the tension spring 62.

This control power driven element is limited in its movement to one complete revolution; to cause it to make an additional revolution the keyboard must be manually operated.

The reciprocal movement transmitted by the eccentric ring extensions 52 to the key bars 53 is the same for all key-bars, and is conveyed by them to a series of bell crank levers 63, so constructed that they will furnish different degrees of movement from the uniform amount of movement received from the key bars 53. For setting up on the numeral wheels a number set up on the keyboard a series of movements are transmitted which comprise units or multiples of units of movement equivalent to the distance between the type faces of the numeral wheels in the numeral printer D; that each of the numeral wheels is thus rotated to such degree that the type face bearing the numeral corresponding to the numeral actuated on the keyboard is rotated to printing position.

For the proper operation of the selector, one of its members (selector arm 66) must be moved longitudinally a different distance for each of the numbers punched in on the keyboard, whereby the numeral wheels contained in the numeral printer D may be rotated such parts of a circle as will bring various type faces incorporated thereon to the printing position. To provide for this varied longitudinal movement of the selector, I have designed the bell crank levers 63 to convert a given movement in each of the key-bars to a varied movement in each of the push rods 64.

The bell crank levers 63 each connected to one of a series of push rods 64, are so designed as to move each push rod a different extent from the others to move the selector carriage 65 in a longitudinal direction, whereby the selector arm 66 will contact and move longitudinally the particular one of the rack bars 67 opposite which it is positioned at the time of each particular operation.

The rack bars 67 are designed to rotate the numeral wheels by means of a rack portion 68, (Fig. 8) thereby contacting the rotating pinions 69 secured to each of the numeral wheels 70; by this means the movement created by the actuation of a key in the keyboard A is transmitted to the numeral wheels 70, which are rotated to bring the corresponding numeral to printing position.

To provide for operating a machine for setting up numerals by means of the single bank of ten keys of the keyboard A, wherein six different numerals are to be set up, I have provided the selector mechanism comprising the carriage 65 and the selector arm 66, the selector arm 66 being successively positioned opposite each of the rack bars 67 for the purpose of actuating them to set up the several numerals required to be printed.

Figure 13:
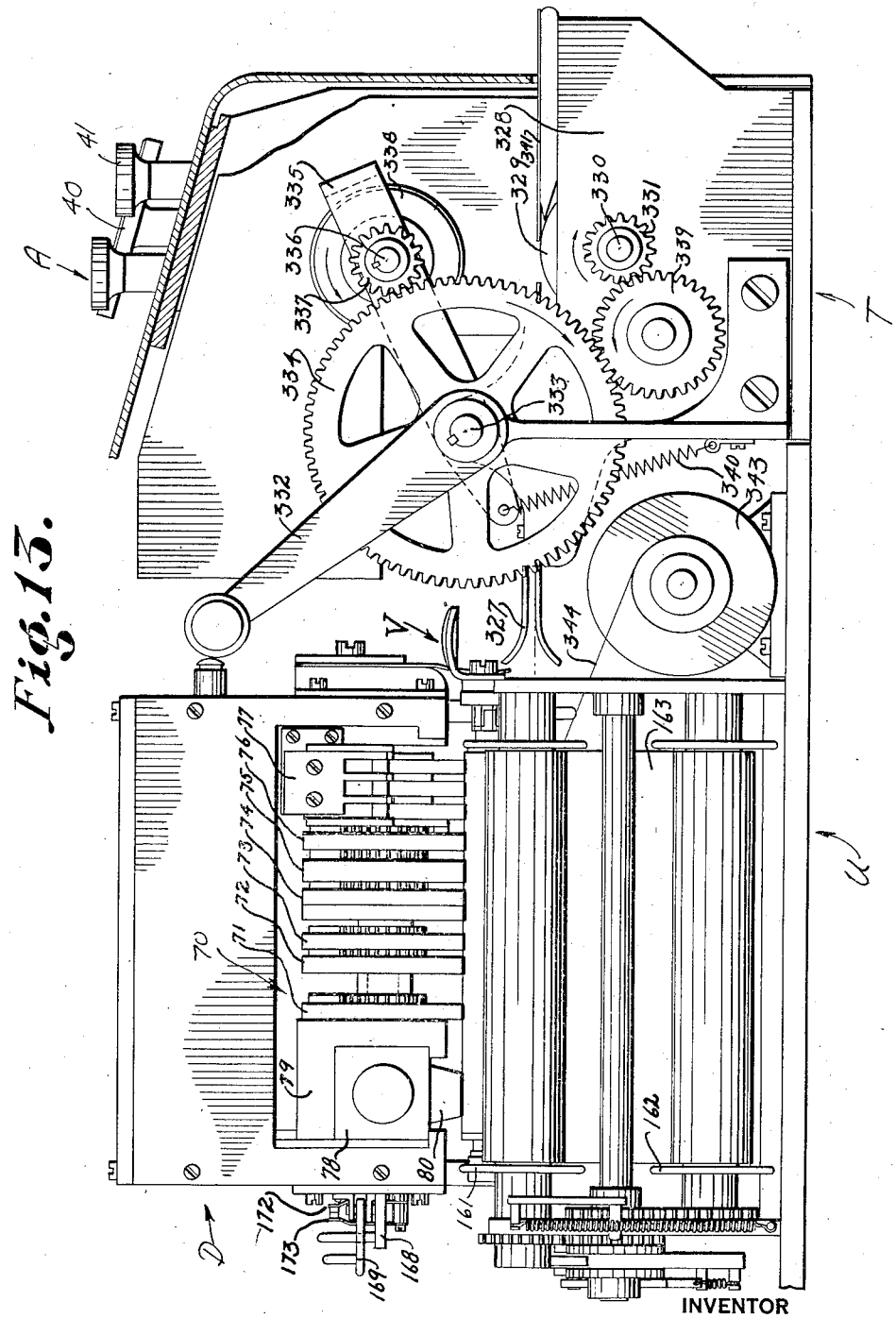
Fig. 13 is an enlarged vertical sectional view showing the numeral printer and the moistener, and taken approximately on line 13—13 in Fig. 3.

In the form of the numeral printer herein disclosed, the arrangement of the figures to be printed is such that the numeral wheel 71, (Fig. 13), is used to print the zone number; the next succeeding wheel to the right is the numeral wheel 72 which is used to print the tens of pounds; the next wheel is the numeral wheel 73, used to print the units of pounds; the next wheel is the wheel 74 used to print the dollars of the numerical value of the stamp; the next wheel is the numeral wheel 75, designed to print the tens of cents of the numerical value of the stamp; and the next and sixth wheel is the numeral wheel 76 used to print the cents of the numerical value of the stamp.

Adjoining these numeral wheels on the right is the automatic numbering device 77, which, at each printing operation of the machine, is increased by one unit, so that it may consecutively print serial numbers upon the stamps as printed; immediately adjoining the series of numeral wheels on the left is a dater device 78 mounted in a carriage 79, which is a part of the numeral printer frame; the dater 78 is supplied with removable type 80, providing for changing the type to the current date.

The selector unit (Fig. 29) comprises a frame 81, which is provided with bearings 82 on which rides the carriage 65, moving in a longitudinal direction with the least possible amount of friction; the carriage 65 is provided with a rail 83 which slidingly supports the selector slide 84.

Figure 30:
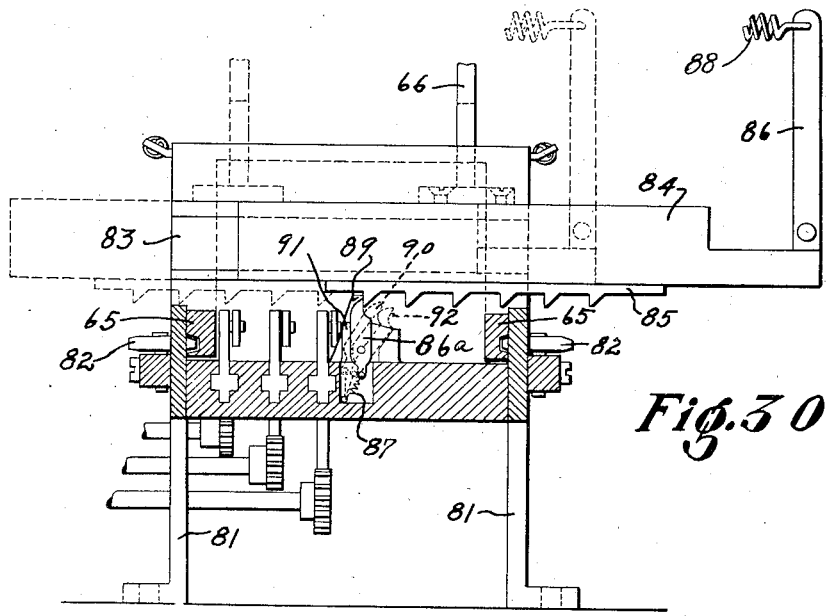
Fig. 30 is a semi-diagrammatic view of the selector, partly in section, from the right showing it in original position in solid lines, and moved to the limit of its lateral movement in broken lines, and also disclosing the escapement mechanism.

The slide 84 has mounted upon its upper portion the selector arm 66, and secured to its lower portion the escapement teeth 85, which are contacted by the pawl 86a, as best shown in Fig. 30, wherein is shown in solid lines the normal position of the pawl 86a, and by broken lines other positions of the pawl under tension of the spring 88.

The selector slide 84 is adapted to travel transversely to the travel of the carriage 65; as it is required that the selector arm 66 be positioned consecutively opposite each of the rack bars 67, so that they may be actuated to rotate the recited numeral wheel 70, I have provided the escapement teeth 85 and the pawl 86a, for the purpose of allowing the selector slide 84 to travel in its transverse movement under tension of the spring 88 which is connected at one end to arm 86 of the slide 84 and at its other end to supporting arm 365.

The selector including its escapement is included in the subject matter of a copending application, Ser. No. 570,632, filed October 23, 1931.

Figure 29:
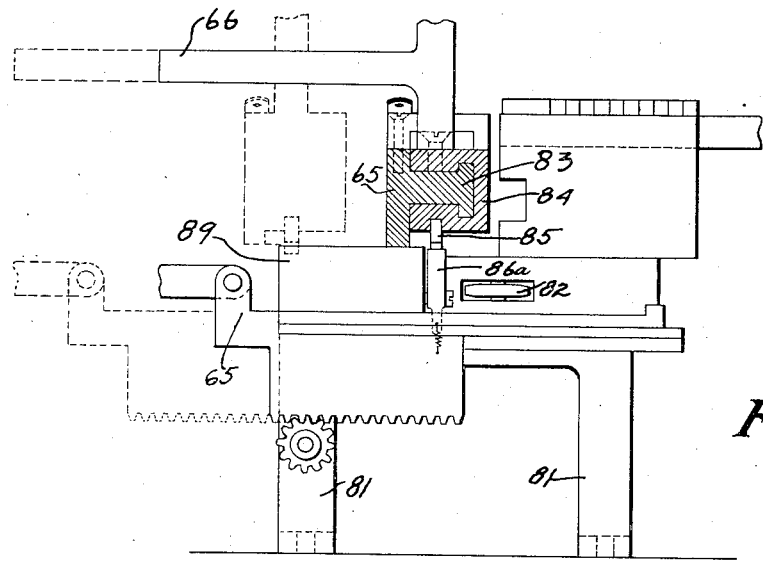
Fig. 29 is a semi-diagrammatic front view of the selector, partly in section, showing it in original position in solid lines, and in a second position in broken lines.

The escapement operation occurs upon the carriage 65 being moved longitudinally, as shown by the broken lines in Fig. 29, to pass the tooth 85 out of contact with the pawl 86a, allowing pawl 86a to move to position 90, Fig. 30. In this operation one of the teeth 85, being opposite the guide plate 89, rides across the face thereof during a longitudinal movement of the carriage 65, and immediately upon the passage of the tooth cut of contact with the pawl 86a, the pawl 86a is moved to the position 90 (shown by broken lines in Fig. 30) under tension of the spring 88, upon the return of the said tooth to the point where it had previously contacted the pawl 86a, the pawl having been removed from that point, the tension of the spring 88 causes the selector slide 84 to travel laterally to a point where the next succeeding tooth will contact the pawl 86a in its position indicated at 90, where it is residing in the path of the next succeeding tooth; the tension of the spring 88 will force the pawl 86a back to the position shown in solid lines in Fig. 30 where it rests against the stop 91; in this position of the pawl and carriage the selector arm 66 stands opposite the next adjacent one of the rack bars 67.

This operation repeats itself automatically at each actuation of the keyboard until six keys of the keyboard have been manipulated; at that time the last rack bar of the group 67 will have been actuated and the set-up completed.

The third position of the pawl 86a (indicated by the broken lines 92, Fig. 30) is the position assumed upon the return of the selector slide 84, when the teeth 85 drag across the top of the pawl 86a and force it down to that position to clear each tooth as it passes; in the return movement the last tooth is brought a sufficient distance past the pawl 86a to permit the pawl 86a to return to the position indicated at 90; thereupon the selector slide 84, under tension of the spring 88 picks up the pawl 86a and they settle back together to a position where the pawl 86a rests against the stop 91, thus positioning the selector arm 66 in front of the first of the group of rack bars 67 which actuate the zone numeral wheel 71.

Figure 12:
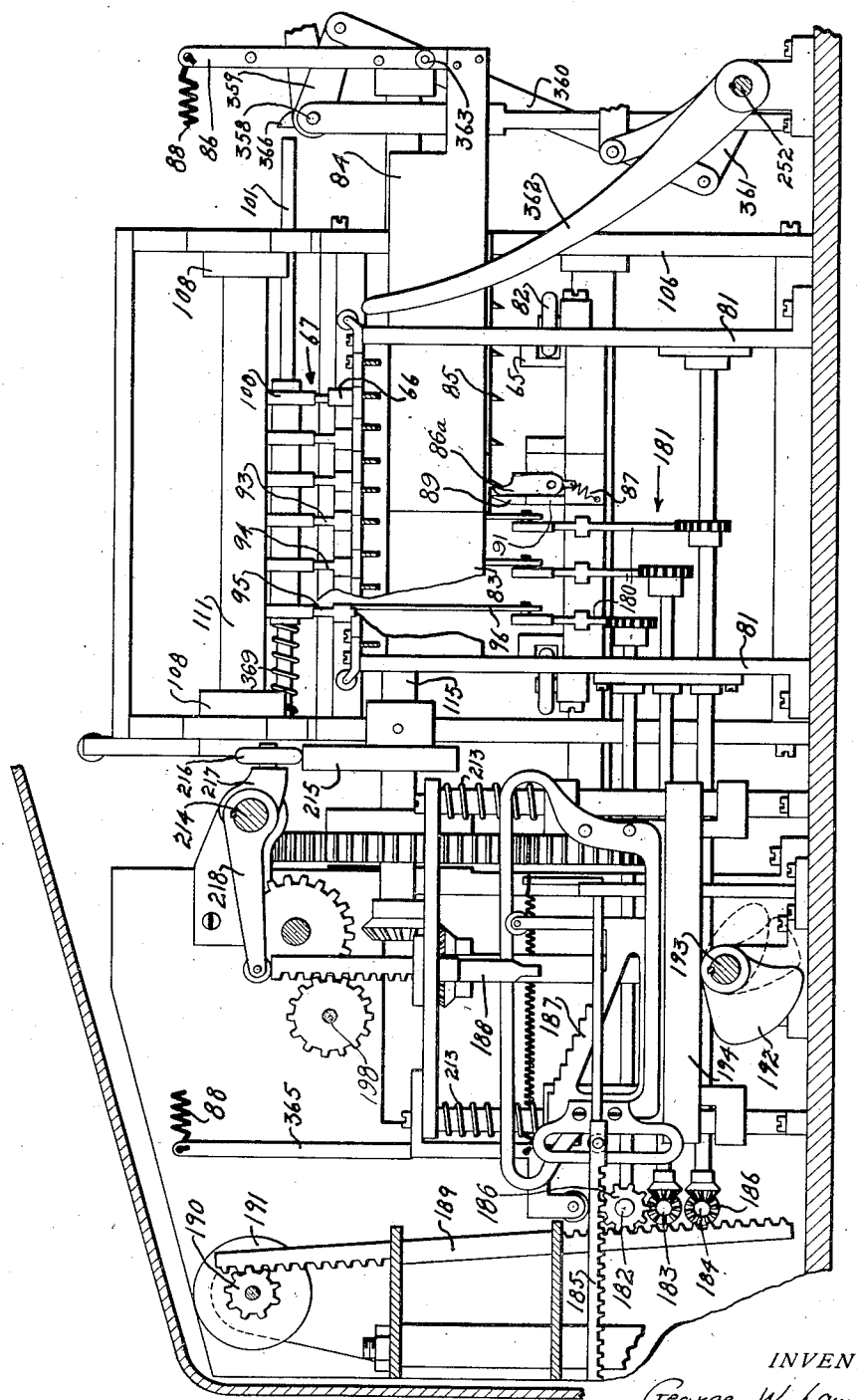
Fig. 12 is an enlarged vertical sectional view, showing the selector and elevators and taken approximately on line 12—12 in Fig. 2.

Thus, the selector, by means of the selector arm 66, actuates the rack bars 67 to rotate the numeral wheels 70 to their required positions; this completes the drive operation from the keyboard and keyboard clutches to the numeral printer. In addition, the rack bars 67 are actuated to set up the monetary value of the stamp in the meter actuating mechanism, which includes the monetary rack bars 93, 94 and 95 (Fig. 12), which will be described hereinafter.

The numeral printer, comprising the dater 78, the numeral wheels 70 and the serial numbering device 77, is designed to print with a reciprocating motion, with the recited elements are combined into one unit with their type faces aligned. To print in conjunction with the duplicating mechanism disclosed, it is required that a hammerlike blow be delivered against the paper tapes to be printed. This is accomplished by the hammer 97, shown in normal raised position in Fig. 8, and in printing position in Fig. 9; these two figures also show the difference of position of the racks 68 and the pinions 69; in Fig. 8 the rack and pinion are in engaged position, when the numeral printer is in non-printing or rest position; in Fig. 9, the rack and pinion are shown in disengaged position at the time of printing.

For the purpose of retaining the geared relation between the rack and pinion during a printing operation, I have provided a locking element 98 comprising the bifurcated lower portion of the hammer 97 adapted to engage, upon its descent, the particular type of the numeral wheels 70 presented beneath the hammer; this engagement occurs and is completed prior to the descent of the numeral wheels 70, so that the lock 98 will positively lock the numeral wheels 70 against rotation during the printing operation.

Upon the descent of the hammer 97 and the numeral wheels 70, the pinions 69 are carried out of engagement with the racks 68, but are retained in the same gear relation thereto until they are returned after a printing operation. For the purpose of retaining the rack bars 67 in the position in which they were set up, I have provided each bar with ratchet teeth 99, which are engaged by pawls 100 mounted on a sliding shaft 101 and spring tensioned to engage the ratchet teeth 99.

Figure 9:
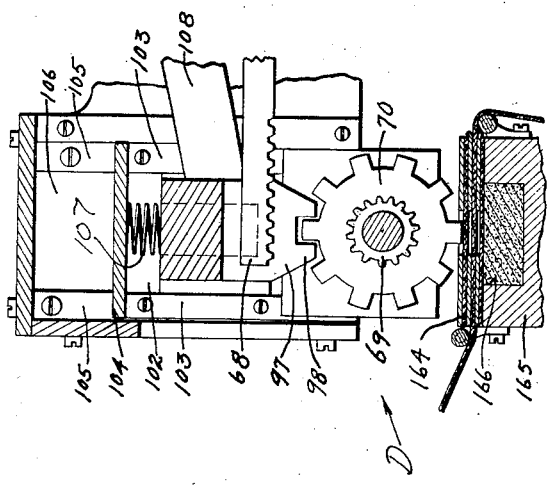
Fig. 9 is an enlarged view of a portion of the numeral printer partly in section similar to the parts disclosed in Fig. 8 showing the printer in printing position.
Figure 10:
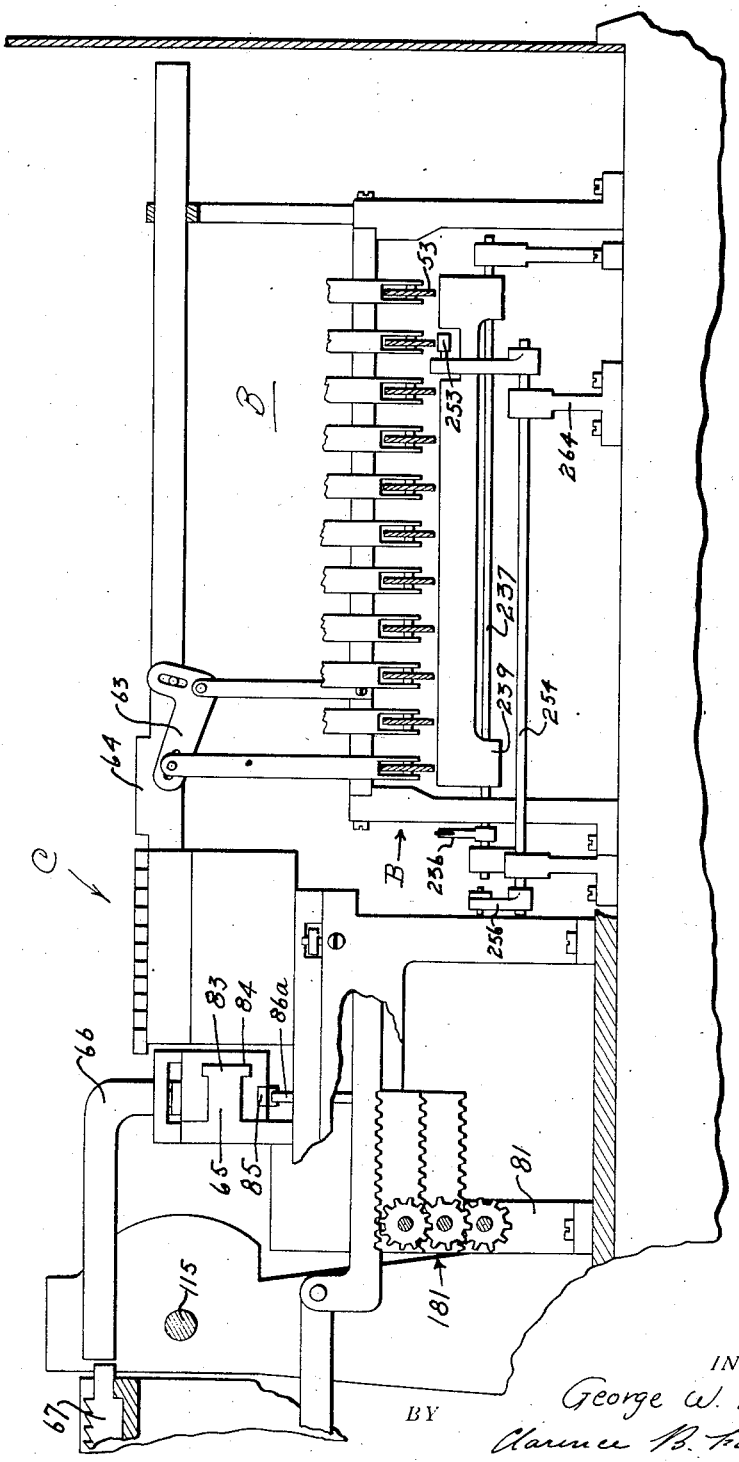
Fig. 10 is an enlarged vertical sectional view, showing the selector and the key bars, and taken approximately on line 10—10 in Fig. 2.
Figure 11:
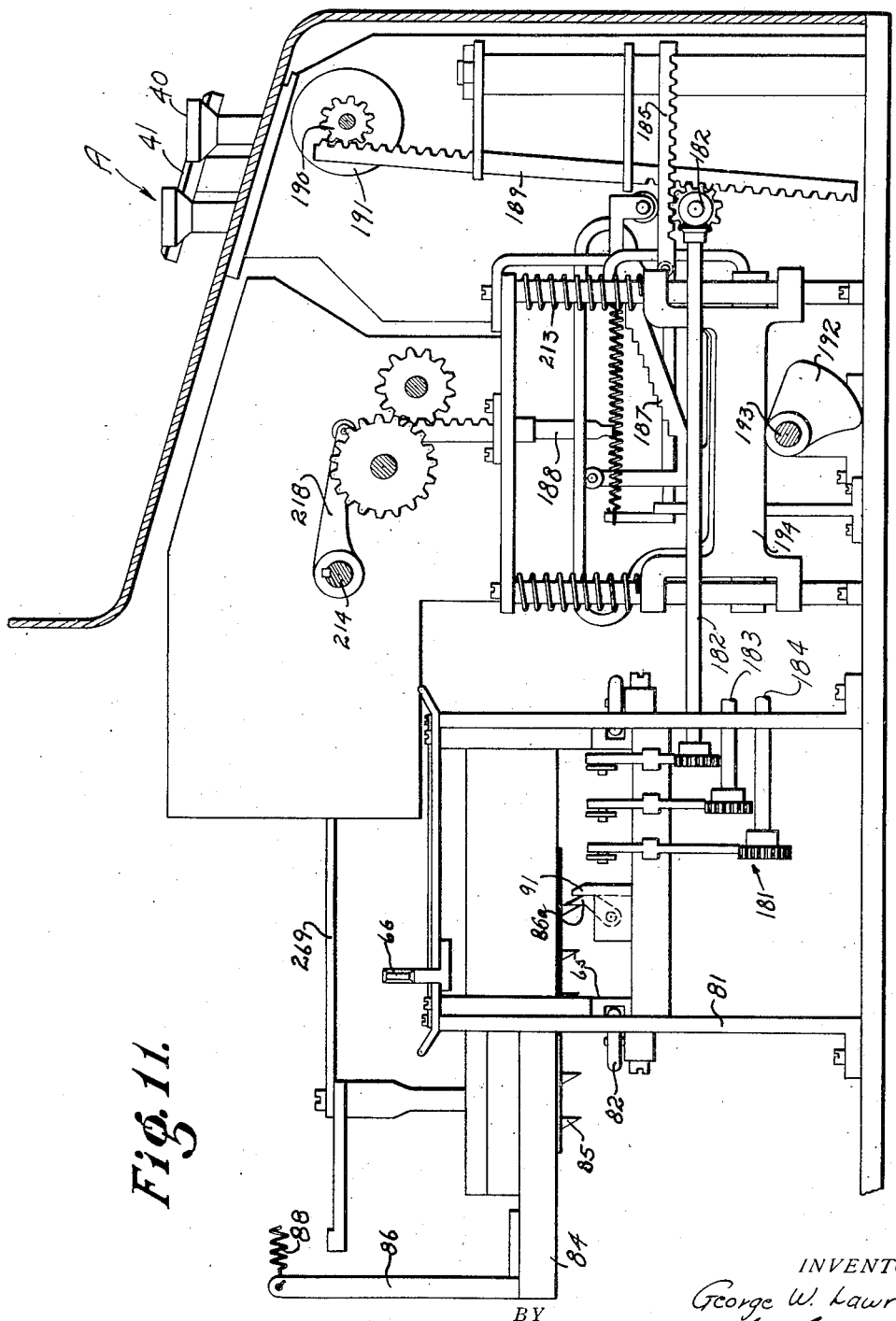
Fig. 11 is an enlarged vertical sectional view, showing the selector and elevators and taken approximately on line 11—11 in Fig. 2.

The printing unit of the numeral printer includes the guide plates 102, one of which is disclosed in Fig. 9, and which move with a vertical reciprocating movement and have attached to them the guide plates 103 between which the hammer 97 travels; the guide plates 102 are secured together at the top by the cross plate 104 and are formed on the back surface to ride upon the tracks 105 secured to the frame plates 106 of the numeral printer.

The hammer 97 is provided with tension springs 107 which maintain a distinct tension between the hammer and the cross plate 104, whereby, when the hammer is at the raised or rest position, the cross plate, by means of the springs 107, maintains the printing unit in an upward position; these springs are sufficiently strong to insure that this printing unit will remain in an upward position until the hammer 97 is lowered to the point where the lock 98 engages the type wheels 70 and pushes the entire printing unit downwardly for a printing operation; the springs 107 are sufficiently strong to raise the printing unit to the original position, (Fig. 8), without allowing the lock 98 to be disengaged from the numeral wheels 70, until the plate 104 has reached the limit of its upward movement; the complete raising of the hammer 97 against the tension springs 107 raises the lock 98 out of engagement with the type wheels 70 (see Fig. 26).

For the purpose of operating the hammer 97 two arms 108 are pivotally connected to the hammer 97 by means of the pin 109 riding in a slotted opening 110 in each of the arms 108. The arms 108 are secured to a rock shaft 111 mounted in the plates 106; as shown in Fig. 24 the rock shaft 111 extends beyond the frame plates 106 and has secured to it a rocking arm 112 which is tensioned by means of the spring 113, secured at one end to the plate 106.

Since the movement of the numeral printer must operate with a hammerlike blow, to that end I have provided that the rocking arm 112, which operates the rock shaft 111, be released and cause this hammerlike blow under the tension of the spring 113. For the purpose of releasing the arm 112 and thereafter returning it to original position, thus raising the numeral printer to its original position, I have provided a series of drive elements, in which the power drive originates in the electric motor R, and is thence conveyed to the drive elements of the numeral printer by means of the power clutch L, the main drive shaft 114, and the secondary drive shaft 115 gear-related thereto; shaft 115 has at one end a drive gear 116 which meshes with and drives a gear 117 secured to the drive shaft 118 of the numeral printer; shaft 118 has secured to it the face cam 119 and the cam 120.

The face cam 119 is provided with a cam groove 121 (Fig. 25) in which travels the cam roller 122 mounted in one end of the rocking arm 112. The shape of the cam groove 121 provides for the necessary straight line travel of the rocking arm 112 when it is released for the printing operation. For the return of the numeral printer from printing position, the shape of the cam groove 121 causes a travel of the cam roller 122 which will rock the rocking arm 112 and thus rock the rock shaft 111, causing the printer unit to be raised and maintained in that position until the next printing operation.

For the purpose of releasing the hammer 97 for the necessary quick-action under tension of spring 113, I have provided a pin 123 mounted on the rocking arm 112 and normally engaged by the trip 124 of the trip arm 125 fulcrumed on the shaft 126; arm 125 is tensioned toward engaged position by the spring 127. For the purpose of operating the trip arm 125 I have provided the cam pin 128 so disposed upon the periphery of the cam 119 that it will engage the trip arm 125 at the proper point in its cycle of operation and raise the trip 124 out of engagement with the pin 123, thus allowing the printing operation to take place under the tension of the spring 113.

The shaft 118 has secured to it a cam 120 (Fig. 24) adapted to operate the knife 129 mounted on one end of a rocking lever 130; the other end of lever 130 is provided with a cam roller 131 engaging the face of the cam 120; during the intervals between printing operations the knife 129 is normally down, in the position it assumes after cutting the paper tape; on the institution of a printing operation the cam 120 raises the knife 129, and it remains in that position until after the printed stamp has been forwarded and the printing operation is complete, at which time the shape of the cam 120 allows the roller 131 to drop into a dwell by spring action and thus lower the knife 129 with a sharp cutting action similar to scissors.

There is a companion knife blade attached below the knife blade 129, and against which the knife blade 129 operates; the knife blade 129 is tensioned toward the companion blade by means of the adjustable tensioning spring 132 secured to one of the plates 106; the rocking arm 130 is tensioned toward the cam 120 by means of the spring 133, and it is the pull of this spring which forces the knife blade 129 down for a cutting operation.

The shaft 118 extends through the frame plates 106 into the printer unit and has secured to it three additional cams which operate other mechanism contained between the frame plates 106. One mechanism consists of the numeral printer inking mechanism, which is provided with an ink roller 134 normally maintained in a rest position at one side of an ink pad 135; the ink roller 134 is operated across the face of the ink pad 135, constructed with an ink well 136 for supplying ink thereto; the passage of the ink roller 134 over the ink pad 135 provides it with a fresh supply of ink prior to each inking operation; after having passed across the face of the pad 135 the roller continues to travel with a longitudinal movement in the tracks 137; near one end of its movement it contacts the faces of the type contained in the numeral printer, and is then returned to its rest position (best illustrated in Fig. 26).

The mechanism to operate the ink roller 134 comprises the cam 138, having a dwell 139 into which the spring-tensioned cam roller 140 enters upon the rotation of the shaft 118; the entering movement being abrupt, the rocking lever 141 is actuated with a rapid movement by means of spring 142 which tensions the mechanism so that the ink roller 134 is forwarded to contact the type faces.

To return the ink roller 134 to its rest position, the cam 138 operates the roller 140 mounted on a rocking arm 143 rockably supported at one end by post 143¹ and connected at its other end to one end of a link 144, the other end of link 144 being connected to a rocking arm 145 secured to the rock shaft 146; this shaft 146 is rockably supported by plates 106 and has secured to it the rocking lever 141 which is tensioned by means of the recited spring 142 to move the roller 140 toward cam 138; one end of lever 141 is loosely connected to the ink roller supporting arms 147; thus the ink roller 134, while spring-tensioned toward the printing point, is maintained at a rest position at one side of the ink pad 135 under spring tension until released by means of the dwell 139 in the cam 138; upon the inking operation being completed the cam 138 returns the ink roller 134 to its rest position and, by means of the peripheral cam face, retains the ink roller 134 in this position until required to be moved for the next inking operation.

Another mechanism contained within the numeral printer and operated by the shaft 118, is the serial numbering device 77 (Fig. 13), which is actuated to increase one unit for each printing operation of the machine; to this end I have provided the came 148 secured on the shaft 118 and provided with a dwell 149 to receive the cam roller 150 mounted on one end of the bell crank lever 151; lever 151 is rockably mounted on the shaft 126 and has loosely connected to its other end the actuating link 152 which contacts the mechanism for rotating the serial numbering device; the bell crank lever 151 is tensioned by means of spring 153 to hold the cam roller 150 against the cam 148 (Fig. 26).

Another mechanism included within the numeral printer is the rack bar return device which is driven by the shaft 118, by means of the sharp tooth cam 154 secured thereon and against which the cam roller 155 is tensioned by means of the tensioning spring 156; the cam roller 155 is mounted on the rocking arm 157, one end of the arm 157 being rockably supported by the post 157′, the other end being connected to the link 158 which is connected to the rocking member 159, rockably mounted on shaft 126, member 159 is provided in its upper end with a cross bar 160 which is adapted to contact the extensions 96 of the rack bars 67 (Figs. 8 and 26) and return them to their original position during a clearing operation of the machine. The cam, cam roller, and other parts of the rack bar return device are shown in detail in the patent to William J. Pearson, No. 2,003,218, issued May 28, 1935.

In the operation of the parcel post machine, a duplicate copy of the stamp is printed at the time the original is printed, and is wound upon a receiving means and later transmitted to the post office with the packages which have been operated upon; for this purpose I have provided means for positioning and retaining the paper tapes and an interposed ink ribbon beneath the numeral printer, the gummed paper tape for the original stamp is above, and the plain paper tape for the duplicate stamp below the ink ribbon; the use of an ink ribbon for this purpose requires the hammerlike blow referred to.

The ribbon device is actuated to provide a fresh portion of the ribbon at the printing zone between successive operations of the printer; upon the winding of the entire length of ribbon from one spindle to the other the device reverses the ribbon and winds it upon the spindle from which it was formerly wound. This reversing operation is effected automatically by the tension of the ribbon. The elements comprising this ink ribbon device are best illustrated in Figs. 3, 5, 8, 13 and 26, the power for the operation of this mechanism is derived from a source which will be hereinafter described.

The ribbon device consists of the spindles 161 and 162 to which the ink ribbon 163 is secured, and upon which it is alternately wound; for the purpose of separating and guiding the paper strips and the ink ribbon, I have provided the guide plates 164 supported by an anvil 165 in which the platen 166 is located; the ink ribbon is provided with guide rollers 167 to prevent excessive wear.

To provide for the operation of the machine for printing purposes, when each of the combined elements contained therein is in proper functioning relation, I have provided in the numeral printer an electric switch device in the motor power circuit; this switch is designed to break that circuit at such times as the dater block 78 is either removed from the machine for the purpose of re-setting the type contained therein, or when it is not properly positioned within the dater carriage 79.

This switching device (Figs. 3, 13 and 27) comprises a locating pin 168 adapted to enter a recess (not shown), in the dater block 78 when the latter is properly seated in the machine; the pin 168 may be withdrawn to allow the dater block 78 to be removed, by means of a switch handle 169 which engages the pin 168; this handle is fulcrumed on the supporting member 170 and is provided at one end with a switch operating element 171 positioned between two switch contacts 172 and 173 which are normally closed; upon movement of the switch handle 169 in either direction the contacts 172 and 173 are opened, thus breaking the motor circuit; upon return of the dater block 78 to its proper position within the dater carriage 79 the pin 168 is properly seated, and the contacts 172 and 173 close and complete the motor circuit, whereupon the machine is again operable. This control is provided for the purpose of assisting the operator of a machine to have the type faces properly aligned within the numeral printer before a printing operation takes place and to prevent operating the machine while the dater block is absent therefrom.

By reference to Figs. 3, 8, 10, 11, 12 and 26, it will be seen that of the rack bars 67, the rack bars 93, 94 and 95 have extensions 96 which, by means of links 180, are connected to the gear relating members 181 and thence connected to the actuating members 182, 183 and 184 which transmit the movements respectively as picked up from the rack bars 67. The rack bar 93 operates the actuating member 184, the rack bar 94 operates the member 183, and the rack bar 95 operates the member 182; in Fig. 12 there is disclosed one of the racks 185 which is operated by the pinions 186 secured to the actuating members; when the racks 185 are thus operated the elevators 187 are moved in a lateral direction, to place the step of each elevator which corresponds to the key actuated of the keyboard A under the corresponding rack bar 188 for actuation of the meters.

The lateral movement of the elevator 187 and the positioning of one of the steps thereof underneath the rack bar 188 constitutes the setting up of the mechanical equivalent of the number set up on the keyboard A by manipulation of a key. This setting up operation includes the movement of the double-ended rack bars 189, (Fig. 12), to actuate the pinions 190 attached to the indicator wheels 191, thus providing the operator with a visual reading of the monetary value set up within the machine so that he may discover any error made and correct the same by clearing the machine and making a new set-up before the printing operation is instituted.

The operation of transmitting the mechanical equivalents, as set up in the elevators 187, into the meters, is instituted automatically at a predetermined point in the cycle of the printing operation of the machine by the cams 192, secured to the cam shaft 193, these cams lift the carriages 194, together with the contained elevators 187, bringing the differentially positioned steps into contact with the lower ends of the rack bars 188, and raising the latter the distance between the positioned steps and the base of the elevators; this distance varies according to the particular step which has been positioned to represent the mechanical equivalent of a number set up on the keyboard A.

This distance of travel will cause the rack bars 188 to be raised a corresponding distance, rotating the contacting pinions 195, 196 and 197 an equivalent amount; the pinion 195 is mounted on the shaft 198 which has mounted on one end the sector gear 199 for driving the cents numeral wheel 200; the pinion 196 is mounted on the sleeve shaft 201 on shaft 198, and has secured to one end the sector gear 202 which drives the tens of cents numeral wheel 203; the pinion 197 is secured to the sleeve shaft 204 on shaft 201, and has secured to one end a sector gear 205 which drives the dollars numeral wheel 206.

The shaft 198 is extended to form the drive shaft for the cents numeral wheel 207 in the total meter G, (Fig. 3); the pinion 196 drives a second gear wheel 208 mounted on the sleeve shaft 209 which is extended to form the driving element for the tens of cents numeral wheel 210 in the total meter; and the pinion 197 is similarly gear-related to the shaft 211 for the purpose of driving the dollars numeral wheel 212 in the total meter; the drive elements of the control meter F and the total meter G are identical and include an internal ratchet drive for the purpose of allowing the conventional carry-over operation from one meter wheel to the other.

The numeral wheel 203 (Fig. 15) comprises a drive gear 221 driven by means of the sector gear 202, and a pair of pawls 222 connected to gear 221 and disposed to engage the ratchet teeth 223 on the internal periphery of the numeral wheel 203; to provide for the carry-over operation of the meter, I have provided the carry-over gear 224 which is operated in a conventional manner; this gear 224 is connected to a flange 225 provided with pawls 226 adapted to engage the internal teeth 223. Thus there is provided a means for rotating the numeral wheel either through the drive gear 221 or the carry-over gear 224 each independently of the other, so that the carry-over operation is permitted to proceed in a conventional manner without interfering with the drive.

The cams 192 on the cam shaft 193, (Fig. 12), are so disposed in their relation to each other that they will progressively follow each other in their actuation of the carriages 194; the consequent successive actuation of the sector gears 199, 202 and 205, transmits the movement progressively to each of the three numeral wheels 200, 203 and 206, thereby allowing the carry-over operation, should there be one, from one numeral wheel to the next succeeding numeral wheel to occur prior to the drive operation of the next succeeding numeral wheel; thus, an independent drive is made to each of three numeral wheels for the purpose of practically simultaneous registering of a three figure number.

The carriages 194 and elevators 187 are returned to their normal lower position by the tension springs 213, upon the completion of the meter-actuating operation and the subsequent rotation of the cams out of the path of the carriages 194; the rack bars 188 and the various connected elements, including the sector gears 199, 202 and 205, are returned by a power return means comprising a rocking shaft 214, cam 215 (Fig. 12) secured to the secondary drive shaft 115, and a cam roller 216 on one end of a rocking arm 217 secured to the rocking shaft 214; this rocking shaft 214 has secured to it three rocking arms 218, 219 and 220, one end of each bearing against the top of the respective rack bars 188; upon a rocking movement of the rock shaft 214, the several rack bars are returned to their lower position.

Another mechanism driven by the setting up operation and the parts actuated therewith, is the progressive release lock M for controlling the printing operations of the machine by directly controlling the connecting of the clutch L; this mechanism prevents a printing operation of the machine except when the keyboard A has been properly manipulated, that is to say, when there have been six key-actuations, which constitute a proper setup for this type of machine.

These six key-depressions operate the progressive release lock to the point where it releases the restraining means connected with certain elements of the clutch L, thus allowing the clutch L to be operated by the control key 41 on the keyboard A.

Figure 20:
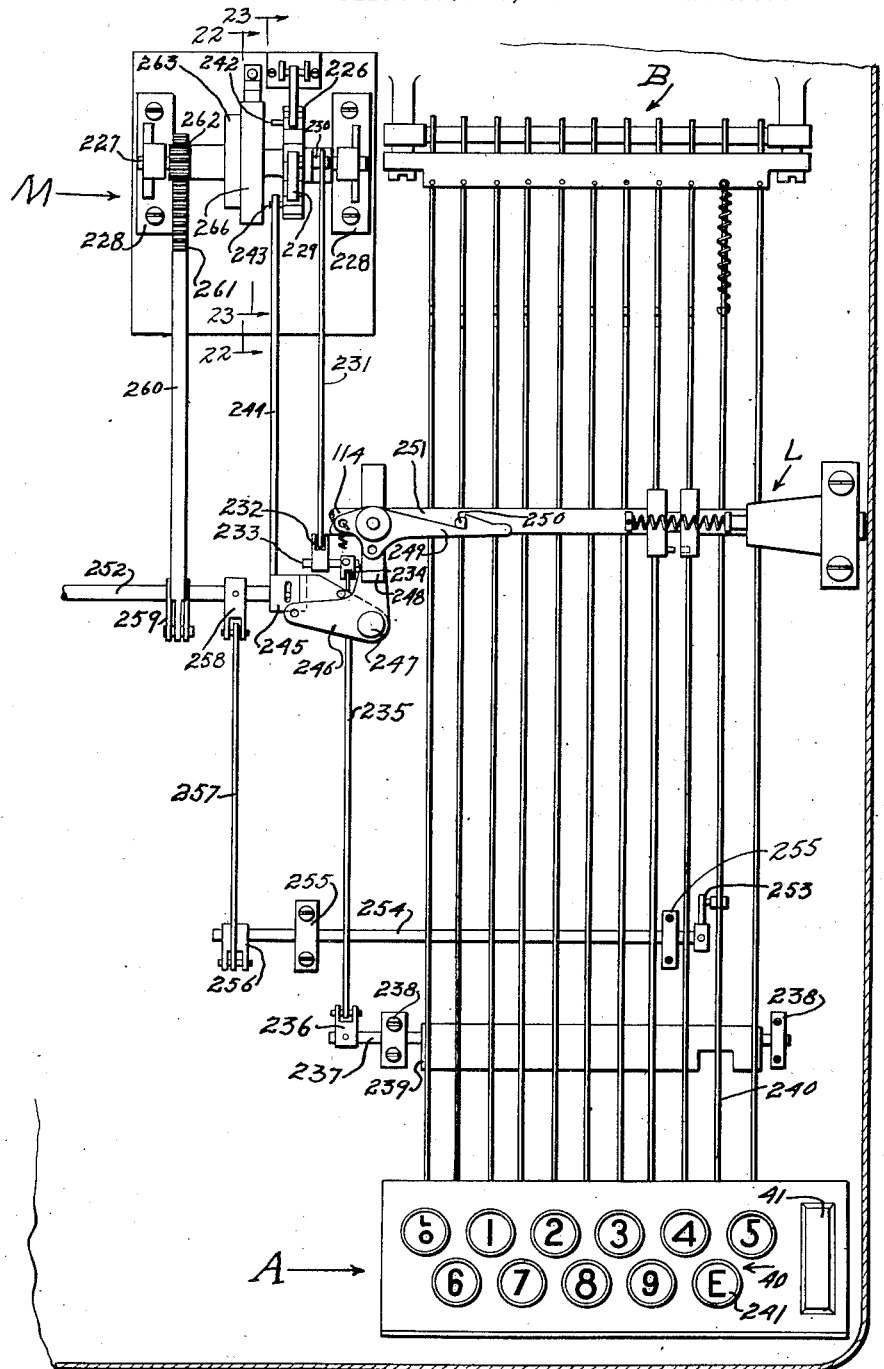
Fig. 20 is a fragmental plan view of the progressive release lock and its connections to the key bar bank and the clutch engaging element.

The progressive release lock M comprises a rotative toothed element 226, (Figs. 20, 22 and 23), secured to a shaft 227 supported in bearings 228; the toothed element 226 has fourteen teeth and is actuated by means of the pawl 229 on the rocking arm 230, which is rotatably mounted on the shaft 227; arm 230 has connected to it an actuating link 231, connected at its opposite end with the rock arm 232, secured to a shaft 233; a rocking arm 234 secured to shaft 233 is connected to one end of a link 235, the opposite end of which is connected to a rocking arm 236 secured to a rock shaft 237 rotatably mounted in bearings 238; a butterfly 239 secured to shaft 237 is disposed immediately below and in the path of travel of each of the key bars B, with the exception of the key bar 240 actuated by the error key 241.

The butterfly 239, (Fig. 20), is provided for receiving actuations from the key bars as they are depressed during a setting-up operation; each actuation of a key bar rocks the butterfly 239, and, through the connections described, rotates the toothed element 226 one tooth; the toothed element 226 is provided on one side with pins 242 and 243 for actuating the locking arm 244 to which is secured the lock element 245 normally contacting the bell crank lever 246 fulcrumed on the support 247 and loosely connected to the latch 248; the latch 248 has a trip portion 249 adapted, under spring tension, to engage a pin 250 secured to a sliding element 251 of the clutch L.

The two pins 242 and 243 are so disposed upon the face of the toothed element 226 that normally they do not contact the lock arm 244, but, as indicated by the broken line circles, in Fig. 23 (which for illustration we will assume as being successive positions of the pin 242), upon the actuation of a key in the keyboard A the pin 242 is rotated with the toothed element 226 a distance equivalent to the width of one tooth, and each successive key-actuation upon the keyboard rotates the pin 242 a like distance.

When five keys have been manipulated on the keyboard the pin 242 has been rotated to a point where it will be in a position to contact the lock arm 244; upon the depression of the sixth key the pin 242 is rotated to the next succeeding position, by which movement it moves the lock arm 244 to the position 244¹ (shown in broken lines in Fig. 23). This removes the latch member 248 from the path of the pin 250, and places the clutch L in operative position, so that it may be operated by the control key 41. The additional movement required to move the pin 242 to the position originally occupied by pin 243 will be described in connection with the re-setting operation.

For the re-setting operation I have provided a series of elements connecting with the clearing mechanism of the machine; the rock shaft 252 (Fig. 20) shown to be manually operated by means of connections to a rocking arm 253 beneath and in the path of the error key bar 240; arm 253, secured to the rock shaft 254 mounted in bearings 255, has on one end a rock arm 256, connected to a link 257, the other end of which is connected to a rock arm 258 secured to the said rock shaft 252; the rock shaft 252 has a rock arm 259 which is connected to one end of a rack bar 260, provided at its other end with a rack 261¹; rack 261 is supported by a roller 261' mounted on bearing 228, and is adapted to engage a pinion 262 rotatably mounted upon the shaft 227.

The pinion 262 has attached to it a driving element 263, and mounted on one face of which are the pawls 264, (Figs. 6 and 22), for engaging the internal teeth 265 of a driven member 266; member 266 is secured to the shaft 227 and which when rotated, rotates the toothed element 226 on that shaft.

The rock shaft 252 is automatically operated at the completion of a printing operation, by means of the drive shaft 114, to clear the machine of the set-up and return the operated parts to their original position; upon the occurrence of this operation the rack bar 260 is moved longitudinally to rotate the pinion 262 and consequently the drive element 263, the pawls 264 of which engage and pick up the teeth 265 within the driven element 266 regardless of their location at the time that this operation occurs, thereby rotating the driven member 266, and consequently the toothed element 226, and thus completing the operation.

During this operation the pin 242 (Fig. 23), rotates from the position 244¹ where it actuated the lock arm 244 upon the depression of the sixth key during the set-up operation, to the position represented as being occupied by the pin 243, in Fig. 23, thus allowing the lock arm 244 to return to its normal position under tension of the spring 267; this leaves the pins 242 and 243 in an original position relative to the arm 244; whichever pin is in either of the two positions of the pins 242 and 243, as shown in Fig. 23, will be termed in an original position, preparatory to the next set-up operation.

For manually clearing the machine, I have provided the error key 241, which, by means of the rocking lever 253 and its connections, rocks the rock shaft 252, and, as part of the clearing action, operates the rack bar 260, thus performing the operation recited in the preceding paragraph; thus the progressive release lock M may be re-set to its original position either automatically upon the completion of a printing operation or manually at the will of the operator.

The clutch L, which is the power clutch disposed between the source of power and the drive shaft 114, is of the type known as a pin clutch, the direct connection between the driving and driven elements being made by means of a pin.

In the operation of the clutch L the operator of the machine depresses the control key 41, which rocks the bell crank 268 (Fig. 7) and thus moves the connecting link 269 longitudinally and operates the trip 270, moving it out of engagement with the pin 250 in the sliding element 251 of the clutch L. For this purpose link 269 is pivotally connected to one arm 269a of a bell crank, the other arm 269b being pivotally connected to a link 269c pivoted to arm 269d of trip 270 (shown in Fig. 2 with parts 269b and 269c broken away). For further details of these connections reference may be had to the patents to William J. Pearson, No. 1,958,925, and Henry Nepple, No. 1,944,994. Assuming that a proper set-up has been made in the machine and that the latch 248 has consequently been removed from the path of the pin 250, the operation of the trip 270 allows the clutch to engage; the sliding member 251 will then move longitudinally under actuation of the compression spring 271 (Fig. 2); this movement of the member 251 moves the sliding arm 272, by means of the pin 273, into the path of the rocking finger 274; the finger 274 is actuated by means of the cam 275 which is secured to the continuously rotating clutch drive shaft 276, which is gear-related to the source of power.

The rotation of the cam 275 actuates the finger 274 to engage the notch 277 in the sliding arm 272, moving the arm longitudinally (upwardly in Fig. 2) and rocking the bell crank 298 and the attached link 279 to cause the clutch to engage; this is effected by means of the connection 280 between the link 279 and the driven member 281 of the clutch, which is slidably mounted upon and engaged to the sleeve shaft 282, and is provided with an engaging pin 283 which engages with the driving element 284 of the clutch, secured to the drive shaft 276; thereupon movement is transmitted through the sleeve shaft 282 to the gear 285 which meshes with and drives the gear wheel 286 secured to the main drive shaft 114 of the machine.

In order to disengage the clutch at the completion of one revolution of the drive shaft 114, I have provided on one side of the gear wheel 286 the cam 287 (Fig. 2) which, in its rotation, contacts the sliding member 251 and returns it to its original position, with the pin 250 contacted and held by both the latch 248 and the trip 270; this return movement of the sliding member 251 returns the slide arm 272 out of the path of the finger 274 and by means of pin 288¹ moves the other sliding arm 288 into the path of the finger 274 where it will then be contacted by the finger 274 under actuation of the cam 275 and move longitudinally (upwardly in Fig. 2) to rock the bell crank lever 289 and move the link 279 to the right; this actuation of the link 279 disengages the driven element 281 and its attached pin 283 from the drive element 284, thus disconnecting the clutch and leaving the various parts thereof in the proper position for the next clutch engaging operation.

The clutch L and its operating mechanism form the subject matter of a copending application, Ser. No. 570,636, filed October 23, 1931.

Figure 14:
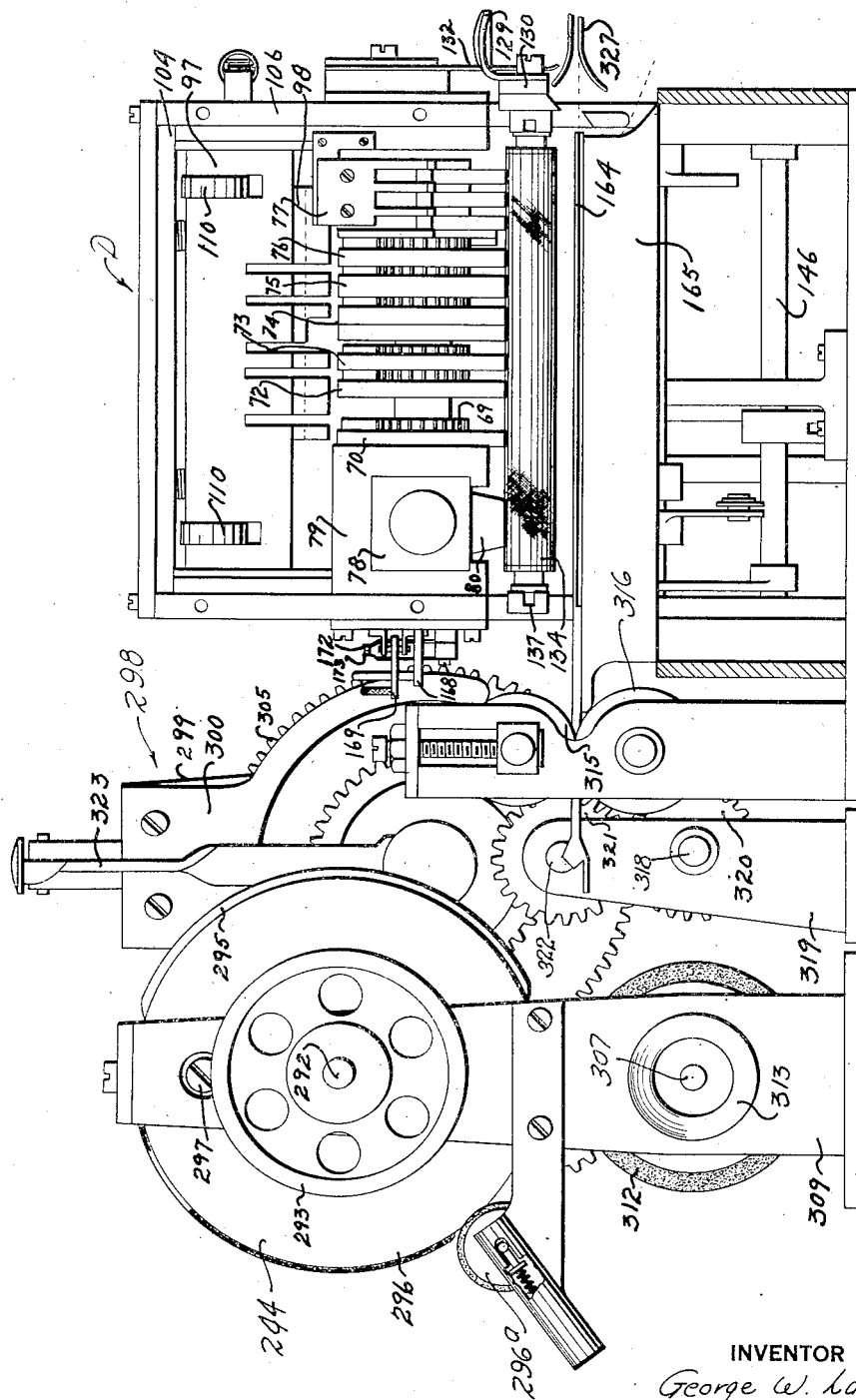
Fig. 14 is an enlarged vertical sectional view, showing the numeral printer and the rotary printer and taken approximately on the line 14—14 of Fig. 3.

For the purpose of printing upon the stamp the stamp form, or such other matter as may be desired, other than the numerals and the date (printed by the numeral printer D), I have provided the so called rotary printer H (Figs. 3, 14 and 28). The rotary printer rotates continuously during a printing operation and is driven by the drive shaft 114 through the drive gear 290, which meshes with and drives the gear wheel 291 secured upon the shaft 292; the shaft 292 has a hand wheel 293 for manually operating the printer for threading-up operation.

Secured to the shaft 292 is the printer drum 294; secured to one portion of its peripheral surface is the indicia plate 295, and upon another portion the ink pad 296, which is supplied with ink by an internal reservoir (not shown), contained within the printing drum 294; this arrangement is for the purpose of making the rotary printer self-inking, and also to provide means for agitating the ink so that its oils and pigments may be kept at all times in a thoroughly mixed condition preparatory to distribution to the face of the indicia plate; to supply ink to the reservoir a screw-cap 297 is set in an opening in one side of the drum 294. For the purpose of distributing ink from the ink pad 296 to the indicia plate 295 I have provided the roller 296a, spring tensioned against the drum 294.

For the purpose of providing movement of the conveying elements and the platen 312 during a portion of the cycle of operation of the machine, I have provided the clutch 298, comprising a supporting member 299 and a track 300 mounted thereon; the track 300 is circular and has approximately one-third of its circumference cut away to provide a contact area for the clutch; the driving element 301 (see Figs. 14 and 28) is secured to the continuously revolving gear 290 fixed to drive shaft 114, and being in the form of a spring, tensions itself against a rotary member 302 rockably secured at 302a to rotary shaft 114 and adapted under the tension of spring 301 to ride upon the track 300. This rotary member 302, frictionally driven by driving element 301, has a contact member 303 adapted to engage one of three lugs 304 secured to one face of the gear wheel 305 when it rides off the track 300 in the open area provided for that purpose, and during that contact rotates the gear wheel 305 approximately one-third of a revolution. The gear 290 therefore functions as the drive element of the clutch Z, since it transmits movement from the drive shaft 114 by means of a contacting element 301 to the rotating member 302 and thence to the driven gear 305. The gear wheel 305 is rotatably mounted upon the shaft 114 and meshes with and drives the gear wheel 306 rotatably mounted in the support 299 and meshing with and driving the gear wheel 306' (Fig. 28) secured to the platen shaft 307 which is mounted in the supports 299, 308 and 309; shaft 307 has secured to it the pulley wheel 310 which is used to drive the winding element for the duplicate tape by means of a belt 311. The construction and operation of clutch 298 are disclosed in detail in the patent to William J. Pearson, No. 1,972,163.

Shaft 307 also has secured to it the platen roller 312 for the indicia plate 295 and a cam 313 for driving the ribbon winding mechanism U through the rocking arm 314. The platen roller 312 provides one of the conveying elements, additional conveying elements being the rollers 315 and 316. These rollers are driven by the gear wheel 305 through the gear wheel 317 secured to a shaft 318 mounted in the supports 299 and 319; secured to shaft 318 is a gear 320 (Fig. 28) which meshes with a gear (not shown) on roller 316; the gear 320 also meshes with and drives a gear 321 secured to the shaft 322 and engaging a gear (not shown) on the roller 315; the platen roller 312 and the rollers 315 and 316, comprising the conveying elements for the two paper tapes, are operated by clutch 298 co-ordinately with the indicia plate 295 reaching the printing point opposite the platen roller 312; by operating the conveying elements during this particular portion of the operative cycle of the machine the stamp is printed from the indicia plate and conveyed forward a stamp length by the time the clutch automatically disengages and the conveying mechanism stops.

In the operation of the printing mechanism of the machine two prints of the indicia plate are made, for presenting one printed stamp length beneath the numeral printer prior to a regular printing operation of the machine. For manually threading up the printing mechanism and printing two stamp forms I have provided a handle 323, by means of which a pin contact clutch 324 secured to the drive shaft 114 is disengaged from the gear wheel 290, thus freeing the rotary printer H, the clutch Z and the conveying elements from contact with the drive shaft 114; this clutch 324 allows only one rotation of the gear wheel 290 before it again engages; consequently the handle 323 must be manipulated a second time to accomplish two printing operations; for the purpose of manually rotating this mechanism I have provided the hand wheel 293.

To prevent the reverse rotation of the main drive shaft 114 and reverse operation of the machine, I have provided a non-reverse element W comprising a ratchet wheel 325 secured to the drive shaft 114 and provided with a friction control pawl 326 adapted to engage in the teeth of the ratchet wheel 325 upon reverse movement of the shaft 114.

Upon the completion of a printing operation the completed stamp is forwarded into a guide plate 327 (Fig. 13), of the moistening element T, and is severed from the remainder of the paper tape by a knife element V; the moistening element T comprises a fluid-holding tank 328, within which is mounted a moistening roller 329 secured to the shaft 330, to one end of which is fixed a gear wheel 331. The moistener T is operated by a handle 332 secured to the shaft 333; this shaft has secured to it drive gear wheel 334, and has rockably mounted upon it the rock carriage 335; rotatably mounted in carriage 335 is the shaft 336 which supports the pressure roller 338 and the operation of which is effected through gear wheel 337 meshing with and driven by the gear wheel 334.

The gear wheel 334 also drives the gear wheel 331 through an intermediate gear wheel 339. The operation of moistening a stamp is performed manually by pulling forward the handle 332, rotating the gear wheel 334 and, through the gear wheels 339 and 331, rotating the moistening roller 329, thus bringing to the contact point a freshly moistened surface of the roller 329 prior to the moistening operation; because of the resistance offered by the engaged gear wheel 337, and the absence of resistance in the rocking frame 335, which is tensioned by spring 340 only for return to original position, the carriage 335 is forced downwardly upon rotation of gear wheel 334, until the pressure roller 338 contacts the moistening roller 329 with the end of the stamp to be moistened located between the rollers; by reason of the resistance interposed by such contact, the rocking carriage 335 ceases its downward travel; the resistance offered by gear wheel 337 thereupon changes to rotation under contact with and upon the gear wheel 334, and acts as a forwarding element as well as a pressure element for the stamp being operated upon between the rollers 338 and 329.

The stamp is forwarded from the rollers on to the discharge plate 341 (Fig. 3), which has slotted openings 342 for withdrawing from the gummed surface of the stamp excess moisture which may have adhered thereto; such moisture, withdrawing by capillary attraction the moisture into the slots 342, drains therefrom into the tank 328. Upon completion of the moistening operation the tension spring 340 returns the various elements to their original position.

For the purpose of receiving the duplicate tape from the numeral printer D and winding it up in preparation for removal by the operator, I have provided a spindle 343 (Fig. 13), the path of the tape being indicated by the line 344; this spindle 343 is driven by the pulley wheel 319, (Fig. 28).

Figure 5:
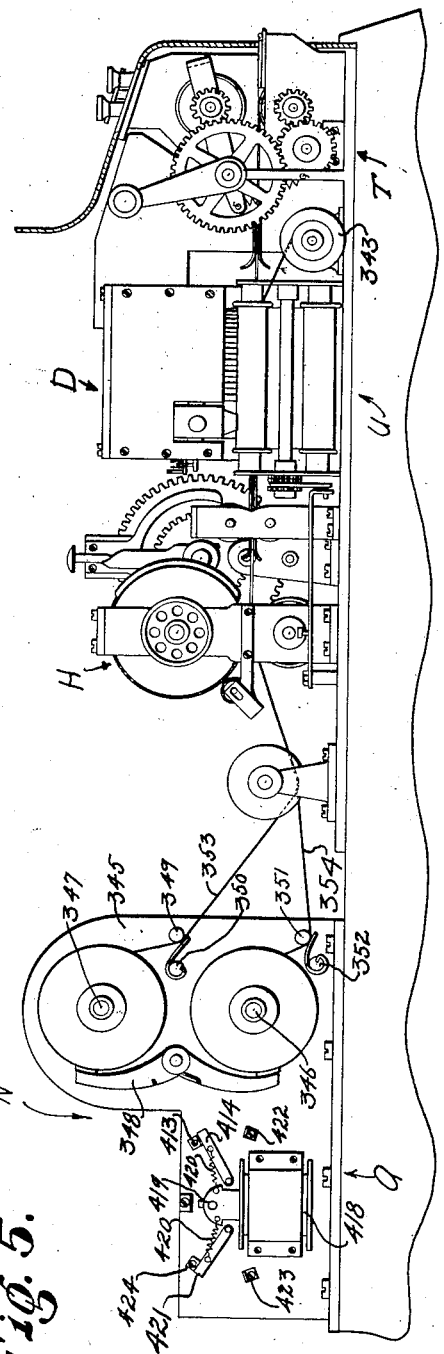
Fig. 5 is a side elevational view from the left, of the interior mechanism disclosed in Figs. 2 and 4.

For the purpose of supplying the paper tapes 353 and 354 in proper form to the machine, I have provided the paper roll carrier 345 (Figs. 4 and 5) which has two spindles 346 and 347 on which the rolls of paper tape are carried and which has a braking mechanism 348 to retard the free movement of the paper rolls; the paper tapes pass between electrical contacts 349, 350, 351 and 352, which are a part of the electrical control system hereinafter to be described. In Fig. 5 the paper roll carrier 345 is shown to the left of the printing mechanism; the paper tape 353 is used as the original and has its underside gummed; tape 354 is used for the duplicate stamp; the travel of these tapes is illustrated by lines extending past the rotary printer H, beneath the numeral printer D and into the moistening element T; the duplicate tape 354 is shown as being wound upon the spindle 343.

The clearing mechanism referred to above is essential to the complete operation of the machine at all times; it must properly function to prepare and properly position all of the operative elements connected therewith or affected thereby preparatory to a setting-up operation and a printing operation. The rock shaft 252 (Fig. 2), may be operated at the will of the operator through the error key 241 on the keyboard A, and is also automatically operated at the completion of each printing operation by means of certain connections, of which the drive element is the cam 355 (Fig. 27) secured to the drive shaft 114; cam 355 is rotated by the drive shaft to engage cam roller 356 mounted on the cam lever 357 secured to the rock shaft 358; this shaft 358 is connected to the rock shaft 252 by means of a rocking arm 359 secured thereon, and to one end of link 360, the other end of which is connected to the rock arm 361 secured to the rock shaft 252; this means effects the rocking of the rock shaft 252, as explained in the description of the operation of the progressive release lock M.

The rock shaft 252 has secured to it the finger 362, (Figs. 6 and 12), for returning the selector slide 84 to its original position at the completion of a printing operation; this finger contacts the roller 363 mounted on the arm 86 to which is connected one end of the tension spring 88, the other end of the spring being secured to a supporting arm 365; this spring is provided for the purpose of instituting lateral travel of the selector slide 84 for the purpose of the escapement operation, as previously described and as illustrated in Fig. 30.

The rock shaft 358 also has secured to it a cam lever 366 (Figs. 12 and 27), which is provided for the purpose of actuating the slide shaft 101 (Figs. 3, 12 and 8), upon which are mounted the pawls 100 for retaining the rack bars 67 in their set-up relation until cleared; the clearing operation consists in the cam lever 366 moving the slide shaft 101 laterally to disengage the pawls 100 from the teeth 99 of the rack bars 67 allowing them to return to original position as described in connection with Fig. 26; the rack bars 67 are additionally tensioned toward the original position by the tension springs 369; the rock shaft 101 is tensioned to automatically return to its original position by the spring 369. This operation of releasing the rack bars 67 to return to their original position also allows the meter set-up mechanism to return to original position.

In a parcel post machine, or in any machine for printing metered postage, provision must be made for setting a meter with the amount of the postage purchased; means must also be provided for locking the entire machine against operation for the purpose of printing postage upon the exhaustion of the pre-set amount and until the meter has again been re-set with an additional purchase of postage. For these purposes I have provided the control meter F, (Fig. 15) which contains numeral wheels 200, 203 and 206, previously described, and three additional wheels 370, 371 and 372.

In the machine disclosed herein the numeral wheel 370 is for the purpose of registering the tens of dollars, the numeral wheel 371 for registering the hundreds of dollars, and the numeral wheel 372 for registering the thousands of dollars; thus the meter may be set for an amount of postage up to $9,999.99 but may be expanded in construction to any capacity required, the form herein illustrated being merely one form of the machine illustrated for purposes of description. The numeral wheel 372, being the highest in monetary value and the last numeral wheel in the train, is utilized for the purpose of actuating the meter controlled locking mechanism; a boss 373 on one face of this numeral wheel is so designed that, upon rotation of the numeral wheel 372 to the 9 point, it will contact a pin 374 on the trip 375.

The trip 375 has a foot 376 for retaining the drive bar 377 in an upward position (Figs. 2 and 16); upon the contact of the boss 373 with the pin 374 (Figs. 17 and 18), the trip 375 is moved outwardly, thereby removing the foot 376 from beneath the drive bar 377, which is thereupon allowed to drop under tension of the spring 378 into a position whereby the engaging member 379 will be in the path of the rocker cam 380 keyed to the shaft 214; therefore, when the shaft 214 is rocked at the completion of the printing operation the cam 380 will be moved from the solid line position to the broken line position illustrated in Fig. 19, the engaging member 379 being engaged by the cam 380 and moved to the position illustrated by broken lines in Fig. 19 and retained there until the control meter is re-set.

The longitudinal movement of the control bar 377, thus effected, operates certain locking members, one of which is the quick-throw switch K wired in series in the motor circuit; and upon the opening of the switch K the motor circuit is broken and the electrical operation of the machine is prevented; the switch K is of the conventional quick-throw type and, therefore, need not be described in detail. Another locking element that is simultaneously actuated, comprises a pawl 381 and a toothed element 382 secured to the drive shaft 114; upon the engagement of pawl 381 with a tooth of element 382 the drive shaft 114 is positively locked against rotation in one direction, the movement of the shaft 114 in the reverse direction being prevented by the non-reverse element W; the pawl 381 is actuated by means of the sliding link 383, connected to a rocking arm 384, which in turn is connected to the drive bar 377; the pawl 381 is spring tensioned to return out of engagement with the toothed wheel 382 by means of the spring 385 (see Fig. 19).

A third locking element actuated by the movement of the drive bar 377 is the keyboard locking shaft 59 (Figs. 19 and 35); this shaft 59 is rocked by drive bar 377 through the rocking bar 386 which is connected at one end to the drive bar 377 and at its other end to a link 387 which operates a rock arm 388 secured to the shaft 59. The clutch elements are normally out of engagement and are engaged upon release of rocking arm 43 from projecting member 45, the rock lever 58, secured to rock shaft 59, riding up on the cam face of cam 48. Operation of the clutches, and consequently of the keys, is dependent upon freedom of rotation of the cam 48 of the clutch with the tooth 54 of latch 46 in engagement with toothed wheel 55. These clutch elements are released when rocking arm 43 is rocked from its position shown in Fig. 36 to that shown in Fig. 35. Arm 43 is rocked to and held in this clutch-release position by pin 61 carried by bellcrank lever 60, the upper arm of which is tilted upwardly when levers 58 and 60 are rocked by a clockwise rocking shaft 59 in Fig. 35. This rocking of shaft 59 is effected through rock arms 388 and 386 and link 387 by movement of drive bar 377 to the right in Fig. 16 and results in effective locking of the keyboard mechanism by locking of the power clutch elements of that mechanism. (See patent to George W. Lawrence, No. 1,987,742, in which this construction is fully disclosed.) Thus, upon the operation of the meter to perform a locking operation by means of the boss 373, the machine is locked at three different points, and these locking means remain in locked position until the control member is again re-set.

For the purpose of re-setting the control meter F, I have provided a mechanism operated through a keylock 389, (see Fig. 15), which may be operated from outside of the machine while the casing is in place and locked. The operation of rotating the lock 389 rotates the crank shaft 390 to which are secured the various resetting elements; the rotation of the crank shaft 390 disengages the meter pinions from the meter carry-over gears and allows free rotation of the numeral wheels; for the purpose of re-setting the numeral wheels from the outside of the machine, I have provided the slidable and rotatable sleeve shaft 391 which projects into proximity to and in alignment with an opening (not shown) in the casing of the machine, so that the operator may, by manipulation of a handle (not shown), applied to the end of the sleeve shaft 391, move that shaft axially to place the engaging gear 392 into mesh with any one of the gears 393 which are in constant mesh with the carry-over gears 224; thus any one of the numeral wheels may be rotated a desired amount by moving the shaft 391 to bring the gear 392 in mesh with the desired one of the connecting gears 393, opposite whichever numeral wheel it is desired to rotate, and, by then turning the sleeve shaft 391, the carry-over gears 224 may be re-set.

I have provided positioning means for locating the numeral wheels in alignment, in the form of a set of springs 394 which engage in the teeth of the gears 393 and which are removed from contact therewith at the conclusion of a re-setting operation. Rotation of the crank shaft 390 operates the link 395, (see Fig. 7), to rock the rock arm 396 secured to the shaft 397, which has secured to its other end the rock arm 398 (see Fig. 16); this rock arm 398 is provided with a pin 399 which, when rocked, raises the drive bar 377, and removes it out of the path of the cam 380 so as to allow it to be returned to its original position by the springs 378 and 400. (See Figs. 7, 15 and 16).

The return of the drive bar 377 to its original position returns the several locking elements to their normal original position, rocking shaft 59 to release the keyboard clutch lock, removing the pawl 381 from engagement with the toothed element 382 and closing the motor circuit switch K. The resetting operation of the control meter must of necessity include a rotation of the numeral wheel 372 to provide the proper set-up; boss 373 is thus removed from contact with the trip 375, which is permitted to return to normal position, the spring-tensioned foot 376, returning beneath the drive bar 377 when raised to its original position and retaining it in that position until the next meter-actuated locking operation.

In the parcel post machine herein disclosed the various operative elements are principally operated and controlled by means of electrical circuits; electric current is also used to illuminate the scale dial, and to provide signal lights to advise the operator when the current is turned on in the machine, and when the paper tapes are not feeding properly to the printers.

Figure 31:
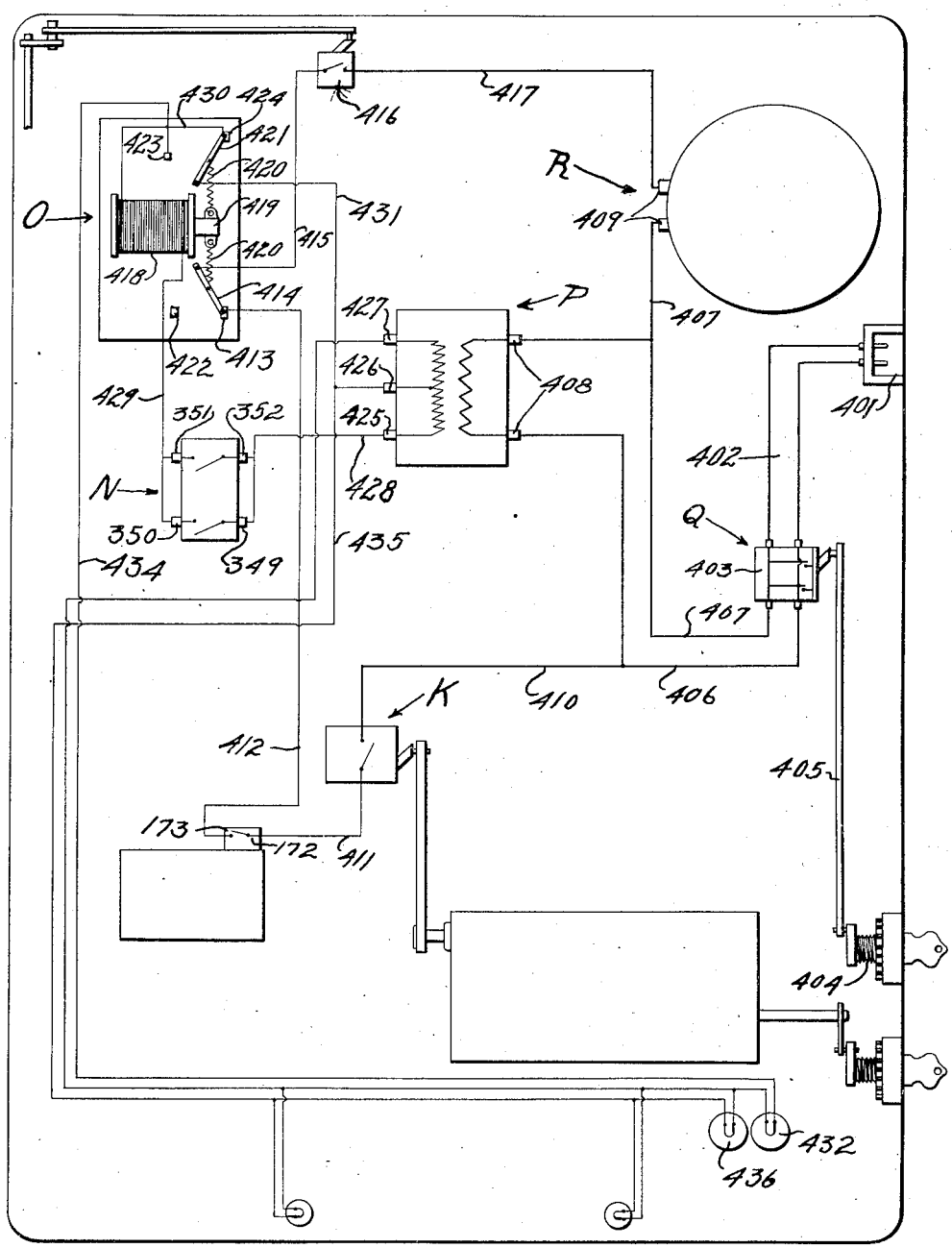
Fig. 31 is a diagrammatic plan view of the electrical wiring system of the parcel post machine.

A plug receptacle 401 provided (Fig. 31) for receiving an extension plug to furnish electrical current to the machine over a pair of main lead wires 402, connected to a main switch 403 operated externally of the machine by means of keylock 404 through a connected link 405; thus the operator may, by turning the keylock 404, open the main switch 403; and upon then removing the key from the lock 404 the machine cannot be operated.

From the main switch 403 the lead wires 406 and 407 connect with the main terminals 408 on the transformer P. The lead wire 407 is also connected directly to one of the terminals 409 of the motor R; the wire 406 is connected with a series of switches wired in series to form a motor switch circuit, so that all of the switches have to be closed before the circuit is completed and the motor R supplied with electric current for operation; this connection of lead wire 406 to the switches is made by the wire 410 which is connected to the meter controlled lock switch K; from this switch a wire 411 connects with the terminal 172 of the dater switch; from the other terminal 173 of the dater switch wire 412 connects to the stop 413 against which the switch blade 414 of the solenoid unit operates; the wire 415 is connected to the door lock switch 416, from which the wire 417 leads to the other terminal 409 of the motor R.

The meter-controlled switch K and the dater switch have been previously described in detail; I will now describe the operation of the solenoid switches O which are operated by means of the paper tapes.

The paper tape rolls are so disposed upon their supporting means that the paper tapes 353 and 354 pass between pairs of electrical contacting elements 349 and 350, 351 and 352; normally these contacts are separated by the paper tapes between them, upon exhaustion or breakage of the roll of tape the contacts close and operate mechanism to stop the machine by breaking the motor circuit and to warn the operator of the occurrence; for this purpose I have provided the solenoid coil 418, the core 419 of which are attached, by springs 420, the two quick-throw switch blades 421 and 414. To the right of the solenoid coil 418 (Fig. 5), is a dead stop 422; to the left is another stop 423 connected with the lighting circuit; above the blade 421 is a stop 424, a part of the solenoid circuit.

The motor circuit wire 412 (Fig. 4) is connected to the stop 414, and the connection through the blade 413, to which the wire 415 is connected, completes the motor circuit. The transformer P is provided with three terminals 425, 426 and 427; I have utilized for the solenoid circuit the two terminals 425 and 426, which preferably provide approximately 24 volts; from the terminal 425 the wire 428 connects to the contact 349; the other contact 350 is connected by wire 429 to the solenoid core 418; the other side of the solenoid core is connected by wire 430 to the stop 424, and the circuit is completed when the blade 421 is up, since the blade 421 is connected to the wire 431, which in turn is connected to the terminal 426 of the transformer P; thus, when either of the paper tapes breaks the pair of contacts between which they pass are then allowed to contact, thus completing the solenoid circuit and pulling down the core 419.

To prevent overheating and injury to the solenoid I have provided that when the core 419 is operated it pulls down the switch blade 421 and thus breaks the solenoid circuit; the movement of the blade 421 downwardly brings it into contact with stop 423 and thereupon closes the light circuit to the signal light 432 on the front of the machine and warns the operator of the trouble with the paper supply.

This lighting circuit (Figs. 4 and 31) comprises the wire 433 which connects terminal 427 and the pilot light, and the return wire 434 connected to the stop 423 and terminal 426. When the switch blade 421 is down, completing the circuit, the current is carried from terminal 427 through the switch blade and the wire 431 to the terminal 426; the lighting circuit through the terminals 426 and 427 preferably provides a current of approximately 8 volts.

The wire 431 (Fig. 31) is connected by means of wire 435 to the lights that illuminate the dial and to the light 436 on the front of the machine, which indicates that the current has been turned on to the machine. After the threading-up operation has been performed the solenoid core 419 may be manually returned to the upper position by means of the handle 437 (Fig. 4), where it is retained by the springs 420; in this position the motor circuit and solenoid circuit will be closed.

In one side of the machine I have provided a door 438, with a keylock 439 (Figs. 1, 32, 33 and 34) for the purpose of providing access to the paper rolls, the inking devices, and the dater; the lock 439 prevents operation of the machine by means of the electric motor or through any manipulation of the keyboard while the door 438 is open. Door-lock 439 comprises, an electrical spring contact switch 416 having its contacting elements 440 and 441 so disposed as to be contacted when the lock 439 is rotated into locked position, whereby the bolt 442 comes in contact with the electrical contact 440 and presses it against the contact 441, thus closing this portion of the motor circuit; Fig. 33 shows the door 438 closed and the bolt 442 as having closed the contacts 440 and 441; Fig. 34 shows the door closed but the bolt 442 in unlocked position.

Additional locking elements are provided to control the operations of the machine and to guard against fraudulent use of the machine or inadvertent printing of an incorrect stamp; among these locking elements I have provided a keyboard lock mechanism which is operated at the time that the printing operation is instituted and which remains locked throughout the cycle of the printing operation and is released at the instant that the printing operation stops.

To this end I have provided a cam 443 secured to the drive shaft 114 (Figs. 2 and 16), and having a dwell 444 for receiving a cam roller 445 mounted on the rocking arm 446; arm 446 is pivotally supported on a standard 446a (Fig. 16), and is connected by a link 447 to a rocking arm 448 secured to the shaft 59 on which the keyboard lock mechanism is mounted; upon the rotation of the drive shaft 114 the cam 443 is rotated to bring the roller 445 out of the dwell 444, after which the roller rides upon the periphery of the cam 443 for the balance of the printing operation, maintaining the keyboard locking mechanism in engagement until the completion of the printing operation, when the roller 445 again enters the dwell 444 and unlocks the keyboard to allow another setting-up operation to be performed; upon the institution of another printing operation the keyboard is thereby locked against any operation whatever; this provides against interference during a printing operation and eliminates the possibility from this source of mutilating the stamp while it is being printed.

The keylock 404 comprises a key-actuated rotatable rack member 404a adjacent a rotatable member 404b provided with pins 404c adapted to be engaged by the rack portion 404d of member 404a and to be rotated thereby; member 404b of lock 404 is connected, by a pin and slot connection 404e, with a link 449 (Fig. 7), and through this link to a rocker arm 450 secured to the key bar lock shaft 59; when the keylock 404 is rotated to open the main switch Q, the members 404a and 404b are rotated, shaft 59 and the locking arm thereon are rocked (Figs. 7 and 35) and the keyboard locking mechanism is thus actuated to lock the keyboard against manipulation of any kind, thus safeguarding the machine against tampering during the absence of the operator.

A recapitulation of the main operation of the machine and the control elements affecting the same is as follows:

Assume that the operative parts of the machine are in their normal starting position, that the several switches are closed in the motor circuit, and that the motor is in operation; to institute a setting-up operation in the machine, the keyboard is first manipulated; for the purpose of description I will use as an illustration the printing of a stamp whereon the figures to be printed are as follows: zone 6, 37 pounds, $2.98.

Figure 6:
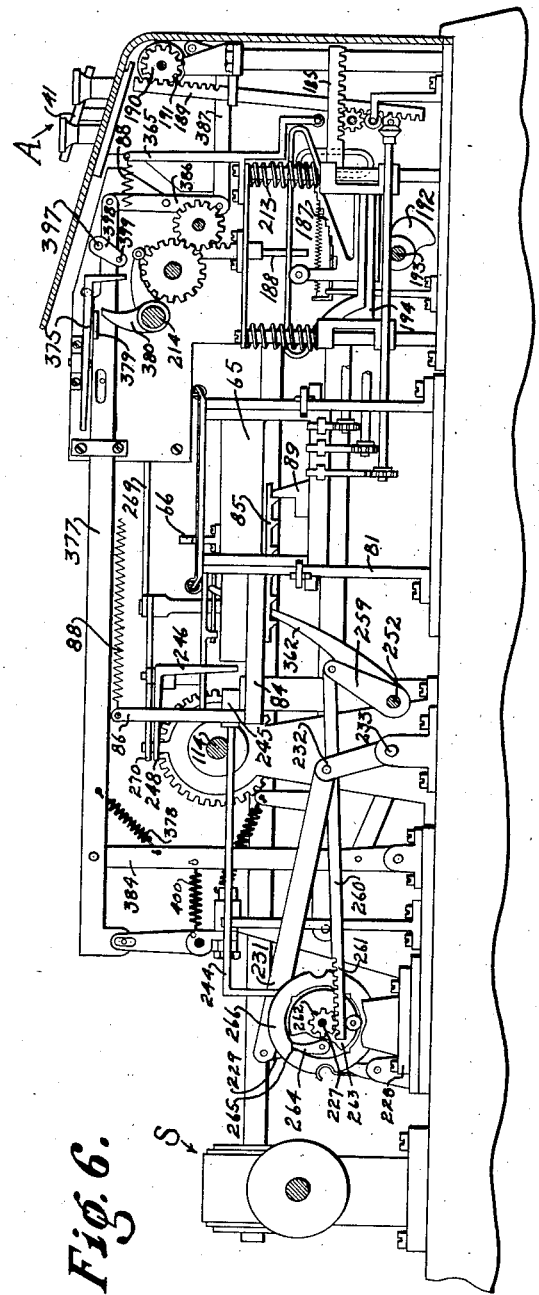
Fig. 6 is a vertical sectional view taken on line 6—6 in Fig. 2.

Since the selector arm 66 is originallly positioned in front of the rack bar 451 which operates the numeral wheel 71 that prints the zone number, the key of the keyboard which bears the figure 6 will be first depressed; this depression engages the keyboard clutch and actuates the corresponding key bar of the group B, and the corresponding push bar 64, which moves the selector carriage 65 in its longitudinal travel a distance equivalent to the figure 6, and thereby rotates the numeral wheel 71 to the point where the type face bearing the figure 6 is in printing position; the return of the selector carriage 65 and the operation of the escapement pawl 86a allows the selector slide 84 to travel laterally a sufficient distance to bring the selector arm 66 opposite the end of the rack bar 452.

The next operation is to put in the figures for the weight of the package; to do this, the tens of pounds must first be put in, and in the illustration being used, the pounds being 37, the first figure to be put in is a 3; therefore the key of the keyboard bearing the numeral 3 must be depressed, whereupon the keyboard clutch actuates the connected key bar and the corresponding push rod which moves the selector carriage 65 longitudinally a sufficient distance to rotate the numeral wheel 72 to the point where the type face bearing the numeral 3 is in printing position; the return of the selector allows its escapement so that the selector arm 66 will be opposite the rack bar 453.

Figure 7:
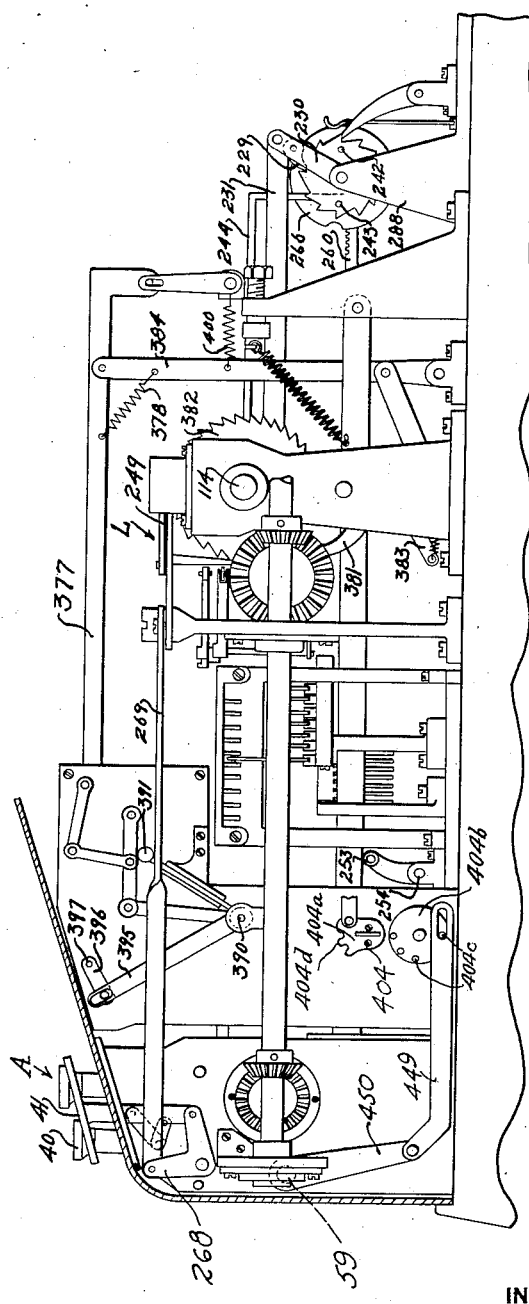
Fig. 7 is a side elevational view from the right, of the interior mechanism disclosed in Fig. 2.

The next key on the keyboard A to be depressed is the key bearing the numeral 7; the same process is repeated to rotate the numeral wheel 73 to bring the type bearing the figure 7 to printing position.

In the illustration being used the monetary value is $2.98; the dollars must be actuated first, and to that end the key bearing the numeral 2 on the keyboard A is actuated; the same process occurs to rotate the numeral wheel 74 so that the type face bearing the figure 2 is turned to printing position. The next figure to be put in is the figure 9; the key bearing the figure 9 must be depressed, which connects the clutches, and by the same process rotates the numeral wheel 75, thus bringing the type face bearing the figure 9 to printing position. The next figure to be put in is the figure 8; the key bearing the numeral 8 is depressed and by the same process will rotate the numeral wheel 76 to the point where the figure 8 is brought to printing position.

Figure 8:
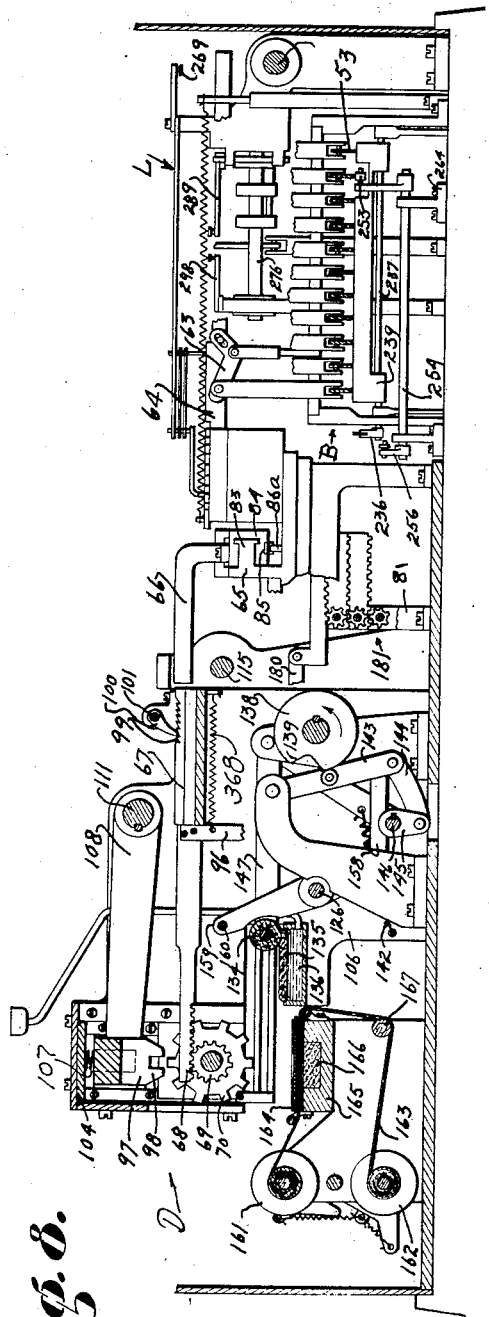
Fig. 8 is a view partly in section taken on the plane crosswise of the machine as indicated approximately by the line 8—8 of Figs. 2 and 3 disclosing the numeral printer, the selector and the key bars.

The monetary value of the stamp which, in the illustration being used, is $2.98, has by this process been set up not only in the printing mechanism, but also in the meter set-up mechanism, by actuating the connecting elements between the rack bars 67 and the elevators 187 so that the elevators are moved laterally a distance such that the different steps in each elevator which represent the mechanical equivalents of the figures 2, 9 and 8 are positioned beneath the rack bars 188 in preparation for transmitting the figures into the meters. By the same operation the same numerals are set up in the indicator wheels 191, which provide a visual reading of the monetary value set up in the machine.

Assuming that the set-up has been correct, and consequently that there have been six keys-depressed upon the keyboard A, the progressive release lock M will have been operated so that the lock 245 will have been removed from the path of the lever 246, and the latch 248 will have been removed from the pin 250, thus allowing the power clutch L to be operated by means of the control key 41 in the keyboard A.

Thus, when the proper set-up has been made, the only operation necessary by an operator in order to print a stamp is the depression of the control key 41; this depression removes the trip 270 from the path of the clutch pin 250 and permits the operation of the sliding element 251, which causes the clutch to automatically engage and rotate the drive shaft 114; the drive shaft 114 makes only one complete revolution to each printing operation, upon the completion of which rotation the clutch L is automatically disengaged by action of cam 287 and stops the machine. The drive shaft 114 operates the rotary printer H, the numeral printer D, and the meter-actuating mechanism E; at the completion of the printing operation the knife 129 is actuated to sever the printed stamp from the paper tape and the clearing mechanism, operated directly from the rocking shaft 252 and its companion shaft 358, clears the machine of the set-up therein and returns the several operated parts to their original position.

The operation of the rotary printer consists in the continuous rotation of the printing drum 294 by the shaft 114 during the one complete rotation of that shaft which constitutes the complete printing cycle; in this rotation the first operation that takes place is the passing of the ink pad 296 past the point of contact with the inking roller 296a, thus supplying fresh ink to the ink roller 296a; a continuation of the rotation brings the indicia plate 295 past the ink roller 296a, whereby it is supplied with fresh ink for a printing operation; the indicia plate 295 does not reach the printing point until after the numeral printer D has operated, and until the point in the cycle of operation has been reached at which the paper tape is to be forwarded by the conveying elements.

The first operation that takes place upon the institution of a printing operation is the inking of the numeral printer D by the ink roller 134, which is connected to and actuated by the shaft 118 to cause the ink roller to pass over the ink pad 135, to receive a fresh supply of ink, and thence beneath and in contact with the various type faces of the numeral printer.

The next operation consists in the printing of the numerals on the stamp by the numeral printer D; the various type faces are aligned to the printing position and are actuated downwardly to contact with the paper tapes and print a stamp upon the upper or original paper tape and, by means of the ink ribbon 163 lying between the two paper tapes, to print a duplicate upon the duplicate tape; upon the type faces being removed vertically to an extent sufficient to clear the paper tapes the conveying elements function to forward the paper tapes; this forwarding movement is instituted by means of the intermittent clutch Z which connects the shaft 114 to the conveying elements and the rotary platen 312, which acts as a conveyor as well as a printing platen against which the indicia plate prints.

The upper paper tape receives a direct imprint from the indicia plate 295 of the rotary printer. There being a full stamp length between the printing zone of the rotary printer and the numeral printer, and another stamp length within the numeral printer, it is necessary that at all times when the paper tapes are at rest there be two printed stamp forms lying beyond the printing point of the numeral printer, so as to supply the printed form beneath the numeral printer ready to receive the printing impression therefrom. This forwarding of the paper tapes passes the upper or original paper tape bearing the completed stamp into the moistening unit by means of the guide plate 327, and the duplicate tape is wound upon the spindle 343. During the upward movement of the numeral printer D the automatic serial numbering device 77 contained therein is actuated to increase its member by one unit.

At the time that the printing operation of the numeral printer D takes place the numerical set-up, which has previously been made in the meter set-up mechanism E, is transmitted into the meters by means of the cam shaft 193, which is gear-related to the drive shafts 114 and 115 and is rotated to make one revolution during the printing cycle. This revolution at the proper period within the cycle of operation contacts the cams 192 successively with the three elevator carriages 194, raising the elevators one at a time and actuating the rack bars 188 to transmit into the meters the mechanical equivalents of the numbers differentially represented by the positions of the elevators 187.

This meter-actuating operation increases the reading of the permanent total meter by the value of the stamp being printed and reduces the control meter reading by the same amount; the control meter is a subtracting meter to provide for operating locking mechanism upon its exhaustion, and to present to the operator a visual reading of the balance of the monetary value of postage remaining in the meter at any time.

The operation of the machine is so timed, within its cycle of operation, that, upon the completion of the operation of the meter-actuating mechanism, the cam 355 has rotated to the point where it will actuate the clearing mechanism to clear all of the set-ups from the machine and return the various operated members to their original position. This clearing operation comprises the rocking of the shafts 358 and 252; the shaft 358 actuates the sliding shaft 101 and releases the rack bars 67, allowing them to return to their original position; the rocking of the rock shaft 252 operates the re-setting mechanism of the progressive release lock M and returns it to original position, thus replacing the lock bolt 245 to lock the clutch L when it is disconnected; the rock shaft 252 further actuates the arm 362 (Fig. 6) to return the selector slide 84 to its original position.

As previously explained, the rack bars 67 have a power return device comprising principally the bar 160, (best shown in Fig. 26), which will return these bars should any of them fail to return under the spring action of the tension spring 368. Upon the operation of the conveying mechanism the platen shaft 307, which actuates the rocking arm 314 which is connected to the ribbon winding mechanism, has rotated the ribbon spindles 161 and 162 so that the ribbon 163 has been moved sufficiently to present a new surface beneath the numeral printer D for the next printing operation.

The last movement that occurs during a printing operation is the operation of the knife 129 which severs the completed stamp within the guide plate 327 from the balance of the paper tape. The printed stamp may now be obtained by the operator by operation of the handle 332 which, as explained in the description of the moistener, operates to moisten and forward the printed stamp for the package to be mailed.

Thus, the manually instituted operations of the keyboard A for setting up numerals in the machine are controlled by the connected drive elements, which incorporate into the manipulations of the keyboard, power to actuate the various elements through which the set-up is made; which actuate and control the movements of the selector and its various parts, including the step by step movement of the escapement of the selector slide 84; which govern the numeral wheels to rotate according to the particular key manipulated in the keyboard, to bring to the printing position the proper type face; and which differentially move the elevators 187 to the proper positions wherein they represent in relation to the rack bars 188, mechanical equivalents of the numbers of the keys manipulated on the keyboard A.

The operation of the machine for printing purposes is fully governed and controlled by a control drive, the clutch L being restrained from operating until the machine has had a proper set-up made in it and the movements of the clutch L being controlled to the end that the drive shaft 114 is allowed to make only one revolution during a printing cycle, whereupon it is disconnected from the source of power. For the purpose of returning these various control elements and other operated elements of the machine to their original normal position, clearing mechanism is incorporated in the machine; the movable control elements are always returned to a controlling position at the completion of a printing cycle; the non-movable control elements continue to function in their respective cycles of operation upon consecutive operations of the machine.

While the form of mechanism here shown and described is adapted to fulfill the objects stated, it is to be understood that it is not intended to confine the invention to the one form of embodiment herein disclosed, for it is susceptible of embodiment in various forms, all coming within the scope of the claim which follows.

I claim:

In a device of the character described, printing and registering mechanism, means to operate said printing and registering mechanism, keyboard clutch means adapted to be actuated to connect said operating means with said printing and registering mechanism to set up numerical combinations in said printing and registering mechanism, locking means preventing said connection of said operating means, means for releasing said locking means to permit the actuation of said printing and registering mechanism when a proper numerical combination has been set up by said keyboard mechanism, clutch-locking means for preventing the closing of said clutch means, means actuated by said registering mechanism for operating said clutch-locking means to prevent the closing of said clutch means and the connection of said operating means with said printing and registering mechanism, a manually operable key lock, and means controlled by said key lock for operating said clutch-locking means to lock said clutch means in disengaged condition.

GEORGE W. LAWRENCE.